(12) United States Patent
Hitaka

(10) Patent No.: US 8,225,360 B2
(45) Date of Patent: Jul. 17, 2012

(54) COMMUNICATION SYSTEM, INFORMATION PROCESSING APPARATUS, IMAGE PICKUP DEVICE, CONTROL METHOD THEREFOR, AND STORAGE MEDIUM

(75) Inventor: Yosato Hitaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 561 days.

(21) Appl. No.: 12/425,097

(22) Filed: Apr. 16, 2009

(65) Prior Publication Data
US 2009/0262203 A1 Oct. 22, 2009

(30) Foreign Application Priority Data
Apr. 16, 2008 (JP) ................................. 2008-106801

(51) Int. Cl.
*H04N 5/225* (2006.01)
(52) U.S. Cl. ..................... 725/105; 348/207.2; 358/1.15
(58) Field of Classification Search ........................ None
See application file for complete search history.

(56) References Cited

U.S. PATENT DOCUMENTS
2003/0202539 A1* 10/2003 Fukunaga et al. ............ 370/489

FOREIGN PATENT DOCUMENTS
JP 2006-155240 6/2006

* cited by examiner

*Primary Examiner* — Chieh M Fan
*Assistant Examiner* — Angel L Garces-Rivera
(74) *Attorney, Agent, or Firm* — Carter, DeLuca, Farrell & Schmidt LLP

(57) ABSTRACT

A communication system includes an image pickup device and an information processing apparatus. The image pickup device is connectable to a printer, and the information processing apparatus is connectable to a server device. The image pickup device includes an acquiring unit that acquires printer information indicating information on the printer if the image pickup device is connected to the printer and a transmitting unit that transmits the printer information acquired by the acquiring unit to the information processing apparatus if the image pickup device is connected to the information processing apparatus. The information processing apparatus also includes a display control unit that displays, on a display unit, an indication that the printer indicated by the printer information can be registered with the server device, based upon the printer information transmitted from the transmitting unit.

8 Claims, 19 Drawing Sheets

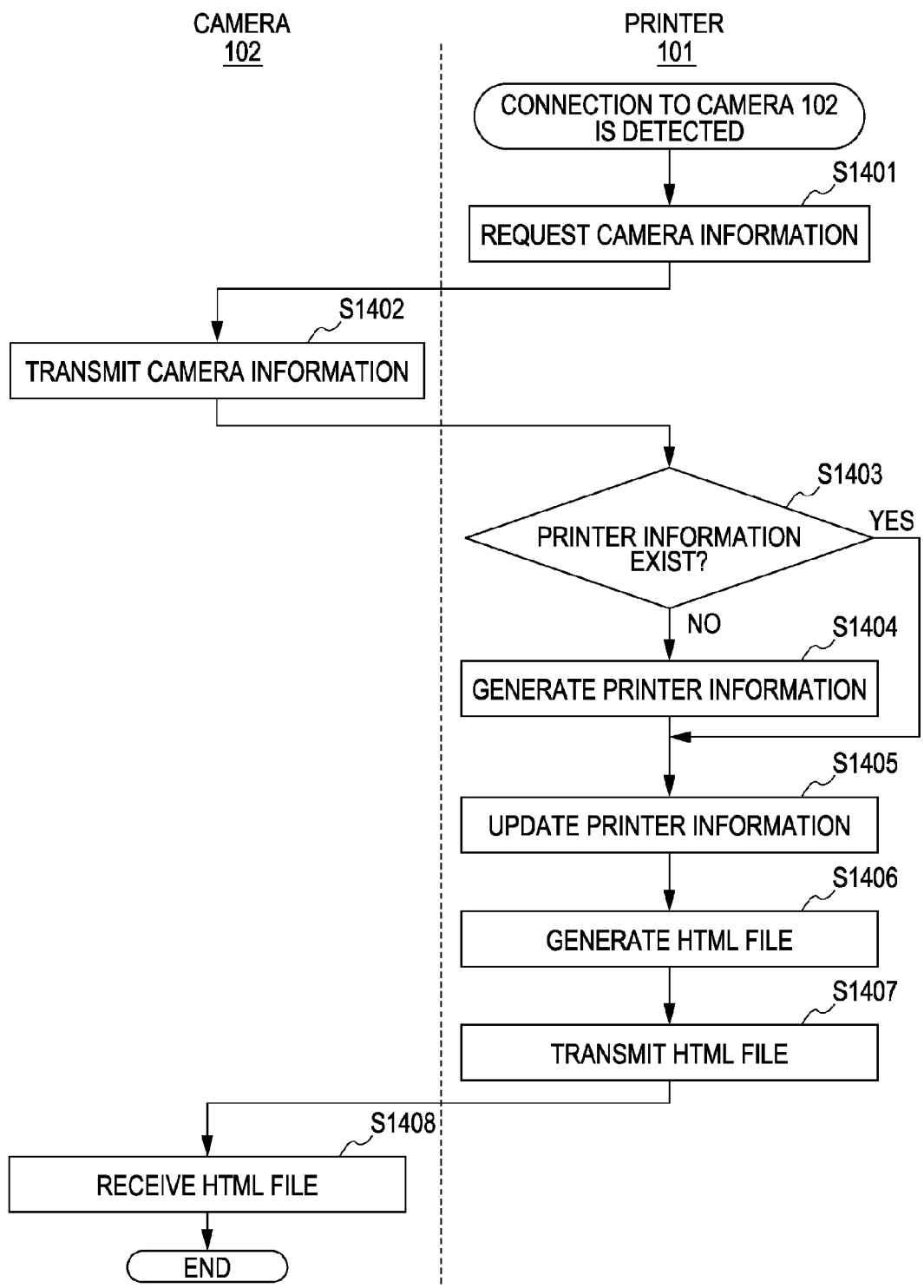

FIG. 15A

Paper in printer is insufficient.

Your printer paper is insufficient.
If you click on the URL below,
the current page will move to the
page where you can buy paper.

Insufficient Paper: Postcard size http://www.yyyyyyyyyyyyyyyy.co.jp

FIG. 15B

Ink in Printer is insufficient.

If you click on the URL below,
the current page will move to the page
where you can buy ink.

Insufficient Ink: Black http://www.zzzzzzzzzzzzzzzz.co.jp

FIG. 15C

You can register your printer.

You can register your printer in a server.
If you click on the URL below,
the current page will move to the page
where you can easily register your printer.
If registering your printer in the server,
you will get convenient service for the printer.

http://www.xxxxxxxxxxxxxxxx.co.jp

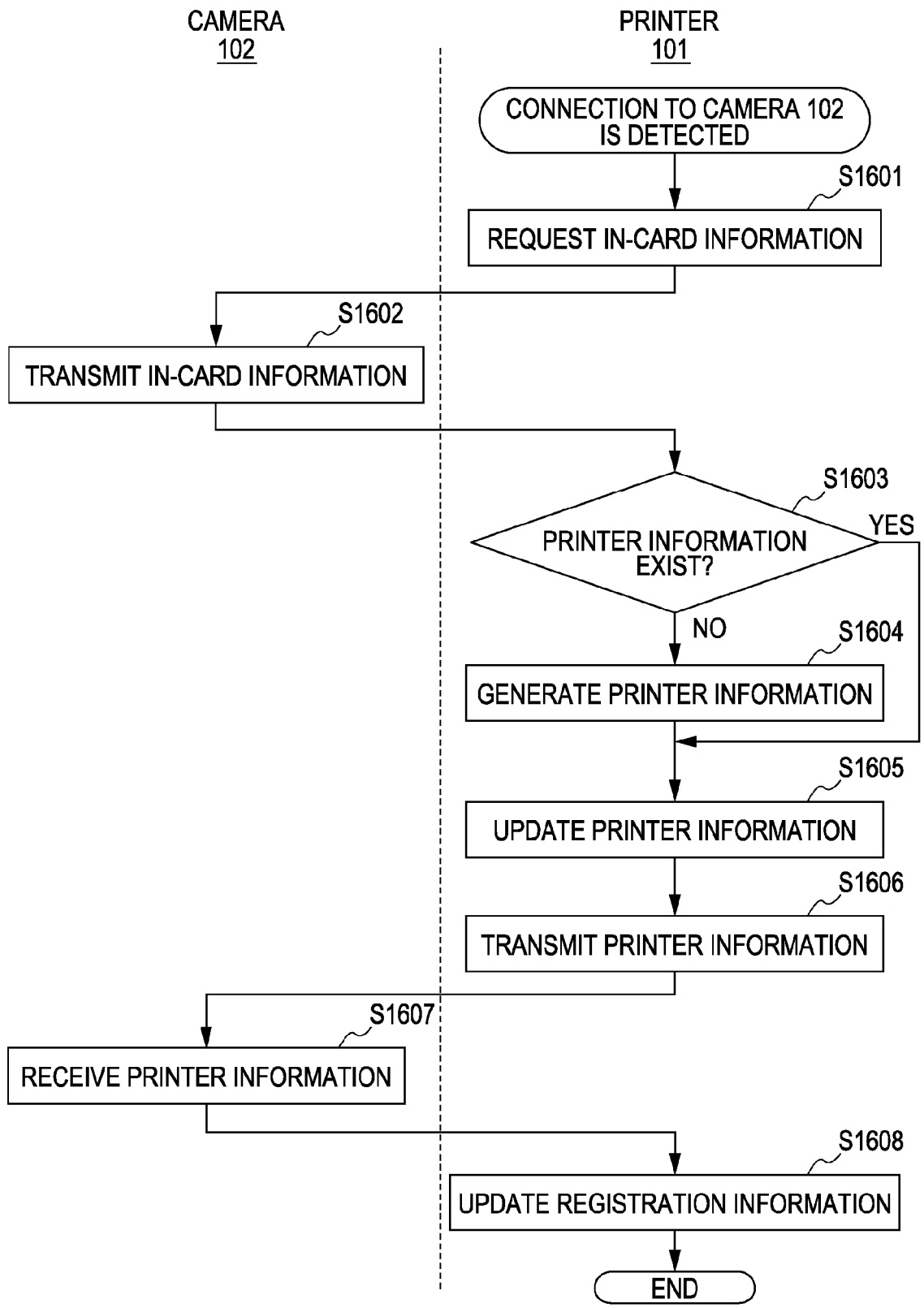

FIG. 17

| REGISTERED PRINTER ID | MEMBER ID IN REGISTRATION |
|---|---|
| PRINTER 0001 | USER A |
| PRINTER 0002 | USER B |

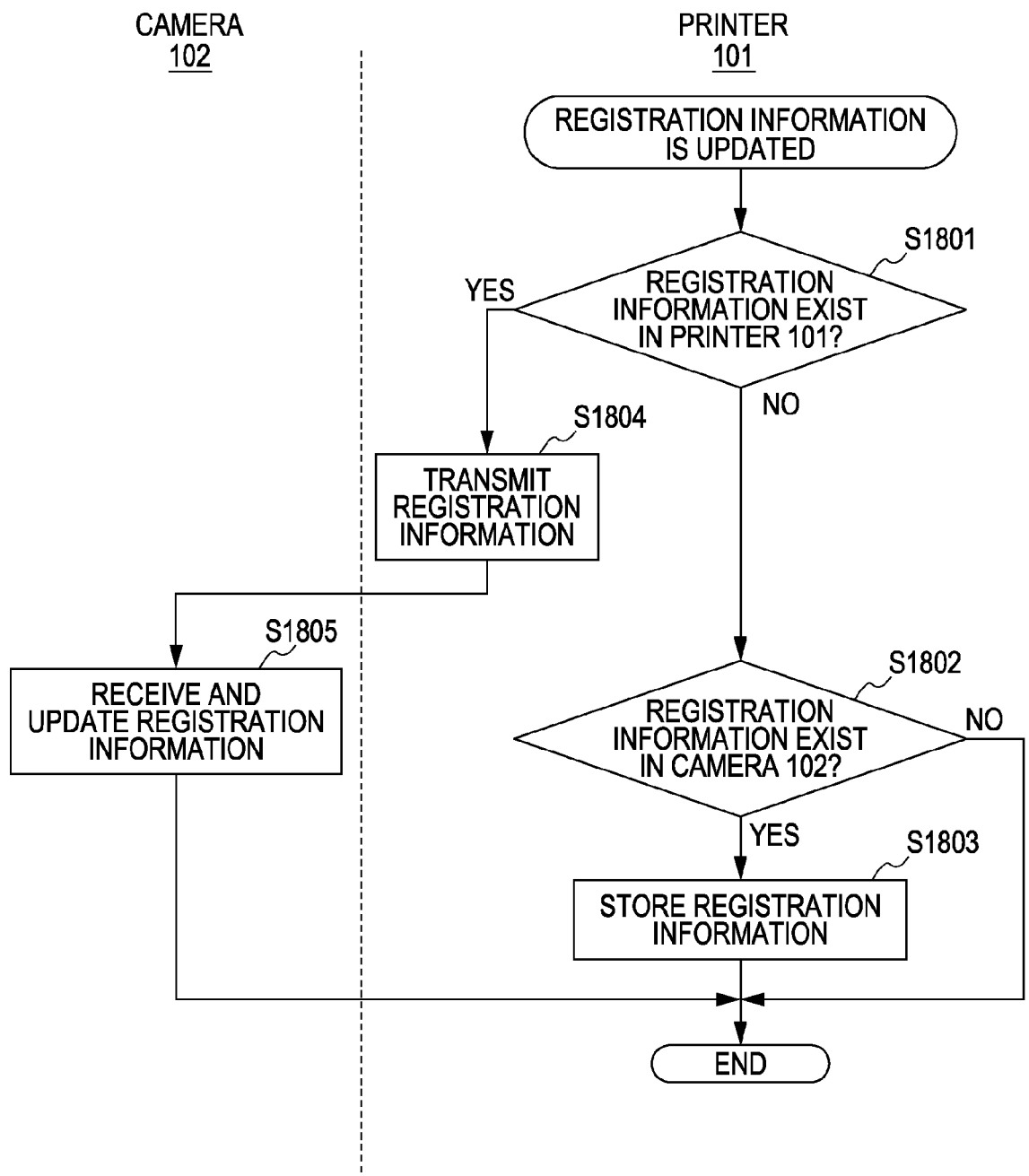

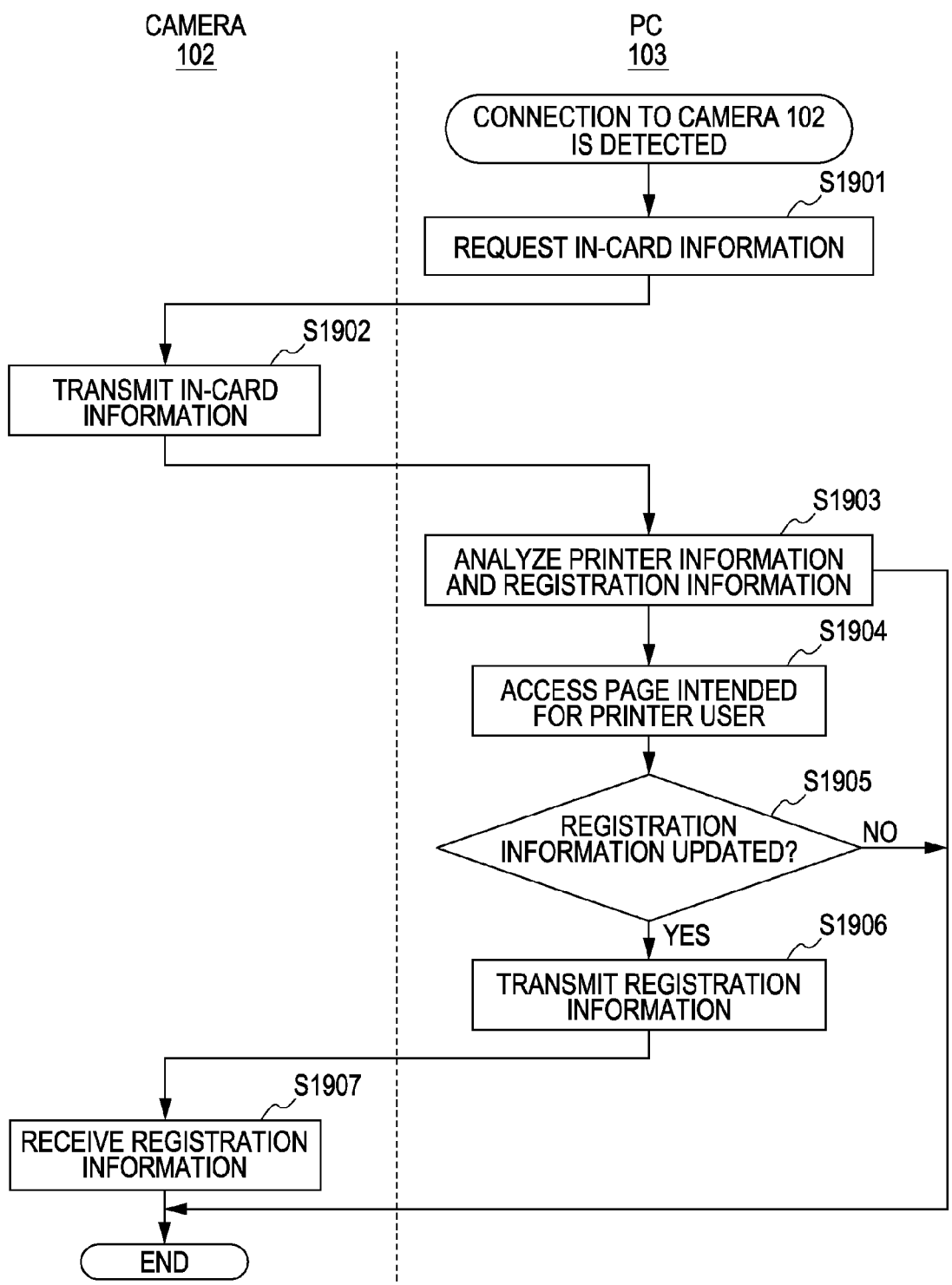

COMMUNICATION SYSTEM, INFORMATION PROCESSING APPARATUS, IMAGE PICKUP DEVICE, CONTROL METHOD THEREFOR, AND STORAGE MEDIUM

BACKGROUND OF THE INVENTION

1. Field of the Invention

The present invention relates to data communication techniques in a system where an image pickup device and a printer are connected and a system where the image pickup device and an information processing apparatus are connected.

2. Description of the Related Art

With proliferation of image pickup devices, such as digital cameras, the variety of service for users of image pickup devices has increased. For example, if a user of an image pickup device accesses a Web server using a personal computer (PC) and registers his/her digital camera with the Web server, then he or she can receive various kinds of services. A user of a printer also can receive service by registering his/her printer with a Web server.

A system that directly connects an image pickup device and a printer and executes printing is widely used (see, for example, Japanese Patent Laid-Open No. 2006-155240). The user of the printer can receive a variety of services by registering the printer with the Web server. However, a printer that has a primary use of printing information while directly connecting to an image pickup device, like the printer described in Japanese Patent Laid-Open No. 2006-155240, has no occasion to directly connect to a PC. Thus, the user may forget to register the printer with a Web server through operation on the PC and miss an opportunity to receive service.

A printer having a primary use of printing information while directly connecting to an image pickup device cannot notify a Web server of the status of the printer. It is difficult for the user to receive Web service in response to the status of the printer.

SUMMARY OF THE INVENTION

According to an aspect of the present invention, there is provided an information processing apparatus connectable to an image pickup device and a server device. The image pickup device is connectable to a printer. The information processing apparatus includes an acquiring unit, a determining unit, and a display control unit. The acquiring unit acquires printer information indicating information on a printer connected to the image pickup device if the information processing apparatus is connected to the image pickup device. The determining unit determines whether the printer indicated by the printer information acquired by the acquiring unit can be registered with the server device. The display control unit displays, on a display unit, an indication that the printer indicated by the printer information can be registered with the server device if the determining unit determines that the printer indicated by the printer information can be registered with the server device.

According to another aspect of the present invention, there is provided an image pickup device connectable to an information processing apparatus and a printer. The information processing apparatus is connectable to a server device. The image pickup device includes a first acquiring unit and a first transmitting unit. The first acquiring unit acquires printer information indicating information on the printer if the image pickup device is connected to the printer. The first transmitting unit transmits, to the information processing apparatus, the printer information acquired by the first acquiring unit as information for use in registering the printer with the server device if the image pickup device is connected to the information processing apparatus.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the present invention and, together with the description, serve to explain the principles of the present invention.

FIG. 14 is a flowchart that illustrates a process occurring when a camera and a printer are connected according to a second embodiment of the present invention.

FIGS. 15A to 15C illustrate examples of a displayed screen according to the second embodiment of the present invention.

FIG. 16 is a flowchart that illustrates a process occurring when a camera and a printer are connected according to a third embodiment of the present invention.

FIG. 17 illustrates registration information according to the third embodiment of the present invention.

FIG. 18 is a flowchart that illustrates a process for updating registration information according to the third embodiment of the present invention.

FIG. 19 is a flowchart of a process occurring when a camera and a PC are connected according to the third embodiment of the present invention.

DESCRIPTION OF THE EMBODIMENTS

Exemplary embodiments, features and aspects of the present invention will now be described in detail below with reference to the attached drawings.

Figure 1A:
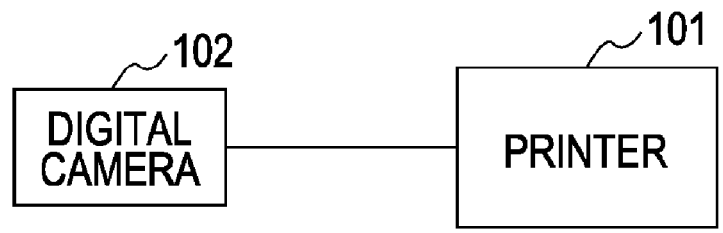
FIGS. 1A and 1B illustrate a configuration of communication systems according to a first embodiment of the present invention.

FIG. 1A illustrates a communication system in which an image pickup device 102 (e.g. a digital camera) being one example of an image processing device (hereinafter referred to as "camera") and a printer 101 being one example of an image output device connectable to the camera 102 are connected. In such a system, the camera 102 can transmit image data stored in a memory card attached therein to the printer 101, and the printer 101 can print the image data.

Figure 1B:
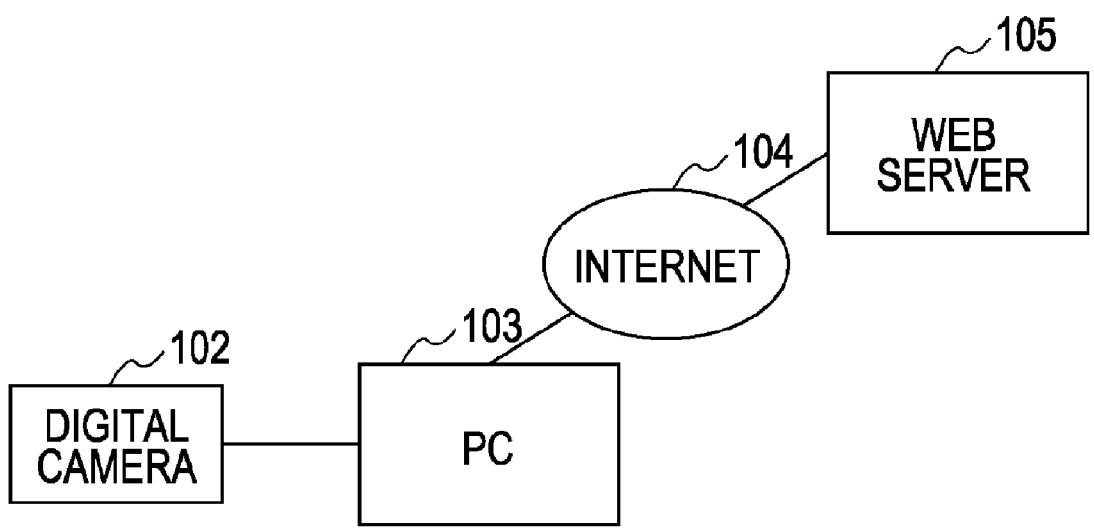

FIG. 1B illustrates a communication system in which the camera 102 and a personal computer 103 (hereinafter referred to as "PC") being one example of an information processing apparatus are connected. The camera 102 transmits image data stored in a memory card attached therein to the PC 103.

The PC 103 can access a Web server 105 being one example of a server device via a network, such as the Internet 104, and can upload image data. The Web server can provide services, such as an online photo album service, and can publish image data uploaded from the PC 103 on a Web page.

The user of the PC 103 can register the camera 102 with the Web server 105 by operating the PC 103, inputting information on the camera 102, and transmitting the information on the camera 102 to the Web server 105. The Web server 105 provides various kinds of services relating to the registered camera 102. The Web server 105 can display an advertisement for an accessory suited for the model of the camera 102 on a Web page in accordance with information indicating the model of the registered camera 102.

As illustrated in FIG. 1B, when the PC 103 and the camera 102 are in a connected state, the PC 103 can acquire information on the camera 102 from the camera 102 and transmit it to the Web server 105. The user of the PC 103 can register the camera 102 with the Web server 105 without an operation for inputting information on the camera 102.

The user of the PC 103 can also register the printer 101 with the Web server 105 by inputting information on the printer 101 through an operation on the PC 103 and transmitting the information on the printer 101 to the Web server 105. The Web server 105 provides the PC 103 with various kinds of services relating to the registered printer 101, similar to the services relating to the camera 102.

In the cases illustrated in FIGS. 1A and 1B, there is no occasion when the printer 101 and the PC 103 are connected to each other. Accordingly, unless the user of the PC 103 intentionally operates the PC 103 to register the printer 101, the user cannot register the printer 101 with the Web server 105.

In the present embodiment, the printer 101 can be registered with the Web server 105, and various kinds of services relating to the printer 101 can be provided.

Figure 2:
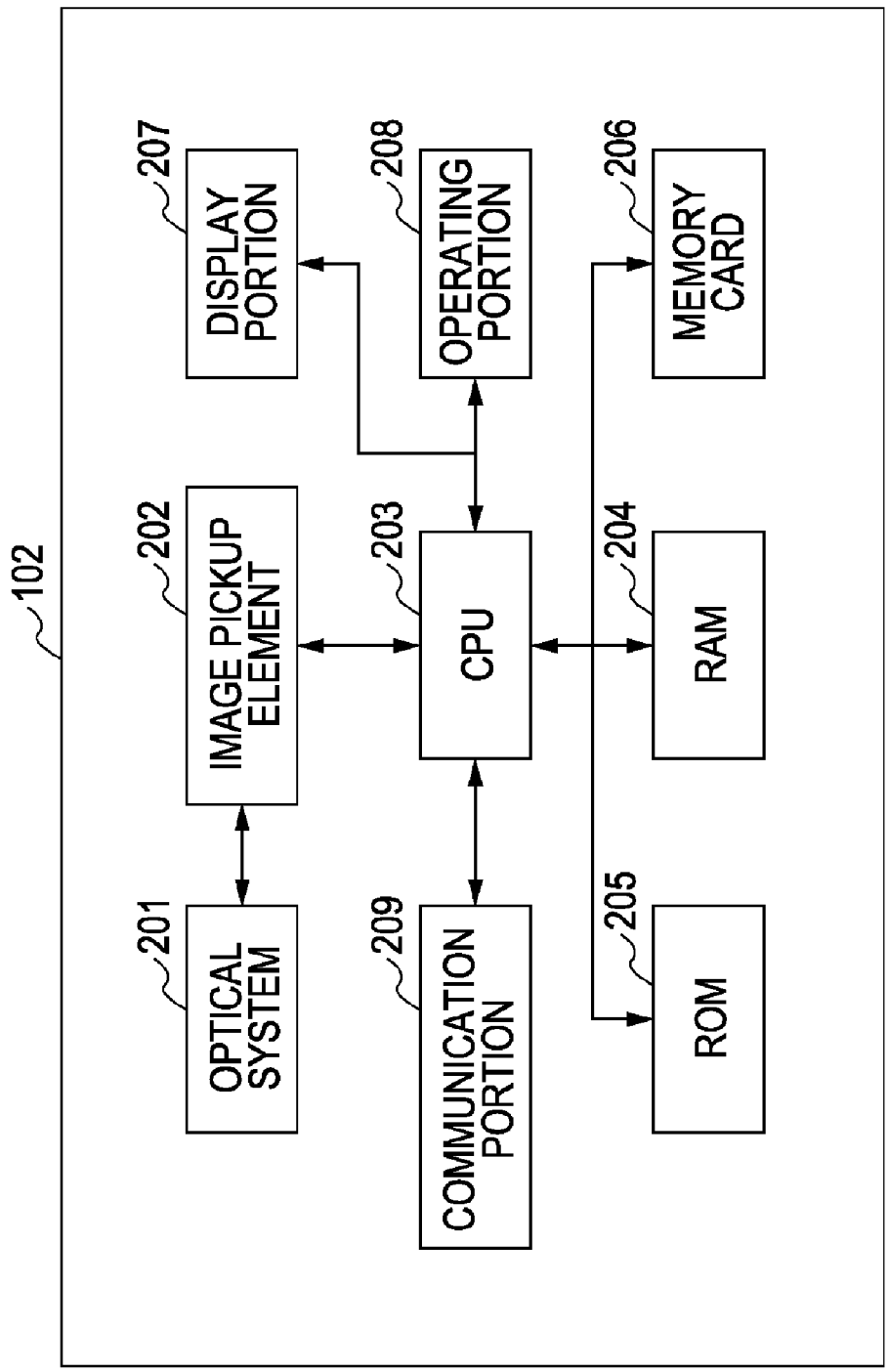
FIG. 2 illustrates a configuration of a camera according to the first embodiment of the present invention.

FIG. 2 is a block diagram that illustrates a configuration of the camera 102 being one example of an image pickup device according to the present embodiment. Examples of the image pickup device include a device for capturing an image of an object and obtaining image data, such as a digital camera and a digital camcorder.

The camera 102 includes an optical system 201, an image pickup element 202, a central processing unit (CPU) 203, a random-access memory (RAM) 204, a read-only memory (ROM) 205, a memory card 206, a display portion 207, an operating portion 208, and a communication portion 209.

The optical system 201 includes a lens, a shutter, and a stop and forms an image of light from an object on the image pickup element 202 using a proper amount of the light with proper timing. The image pickup element 202 converts the light image formed through the optical system 201 into an image.

The CPU 203 performs various kinds of calculations and controls for components constituting the camera 102 in accordance with an input signal and a program.

The RAM 204 stores temporary data and is used as a work space for the CPU 203.

The ROM 205 stores a program for controlling the camera 102 (firmware) and various kinds of setting information.

The memory card 206 stores data of a captured image. The memory card 206 is removable after an image is captured and is attachable in a PC to allow data to be read therefrom. The camera 102 includes a unit for accessing the memory card 206, allowing data to be read from and written in the memory card 206.

The display portion 207 displays a viewfinder image in capturing, a captured image, and characters used for an interactive operation. It is not required for the camera 102 to include the display portion 207, and it is essential only that the camera 102 have a display control function of controlling display of the display portion 207.

The operating portion 208 receives an operation of a user. Examples of the component used as the operating portion 208 are a button, a lever, and touch panel.

The communication portion 209 is connected to an external device and exchanges control commands and data therewith. One example of a protocol for establishing a connection and performing data communication is the picture transfer protocol (PTP). The communication portion 209 may also perform wire communication using, for example, a universal serial bus (USB) cable. The communication portion 209 may also perform radio communication using a wireless local area network (LAN). The communication portion 209 may also be connected directly to an external device and connected to an external device through a server or over a network, such as the Internet.

Figure 3:
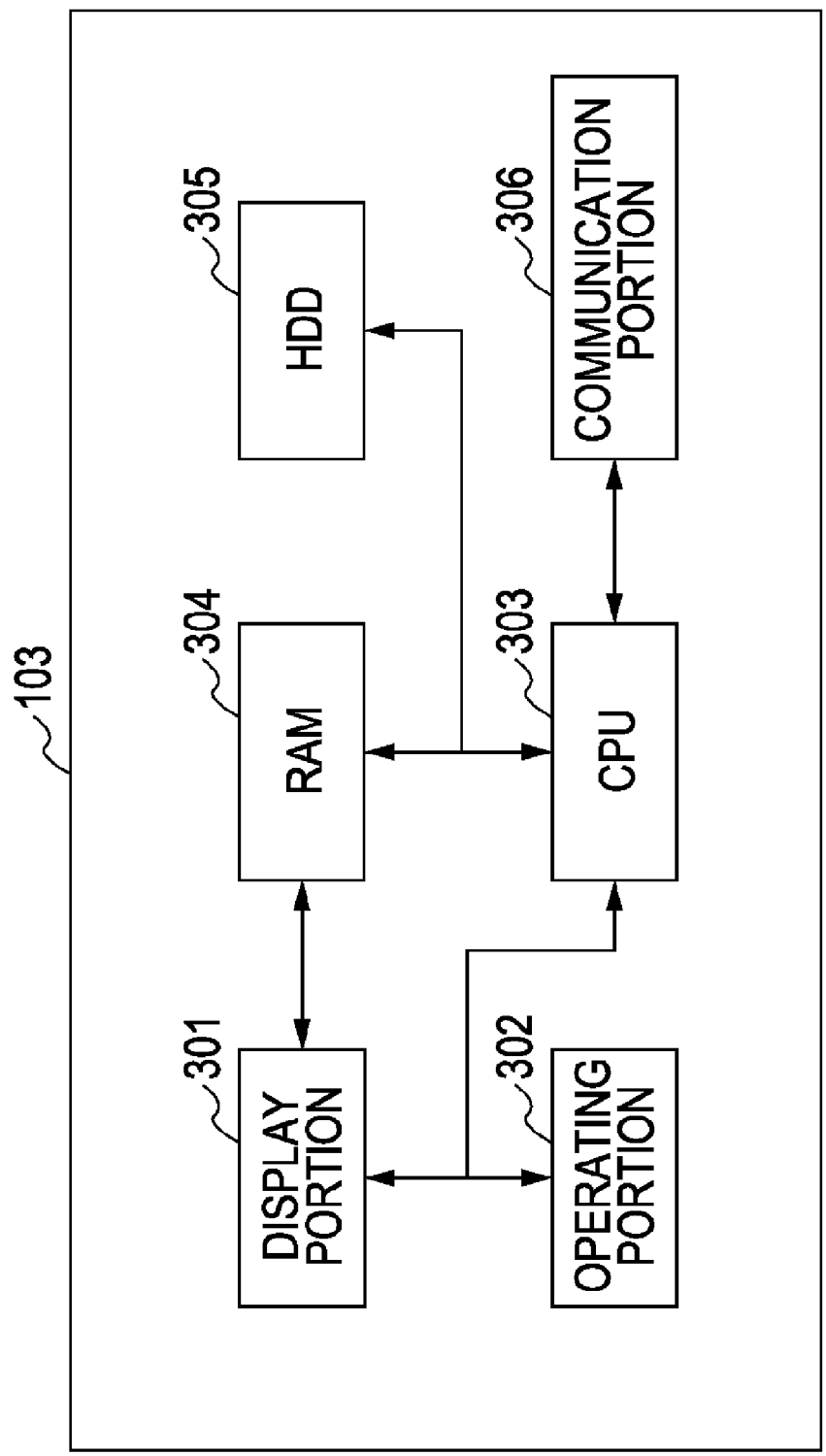
FIG. 3 illustrates a configuration of a personal computer (PC) according to the first embodiment of the present invention.

FIG. 3 is a block diagram that illustrates a configuration of the PC 103.

The PC 103 includes a display portion 301, an operating portion 302, a CPU 303, a RAM 304, an HDD 305, and a communication portion 306. The fundamental function of each of these components is similar to that in the camera 102, and the detailed description thereof is not repeated here. One example of the component used as the display portion 301 is a display device, such as a liquid crystal display (LCD). It is not required for the PC 103 to include the display portion 301, and it is essential only that the PC 103 have a display control function of controlling display of the display portion 301. Examples of the component used as the operating portion 302 can include a keyboard and a mouse. In place of the memory card 206, the hard disk (hereinafter referred to as "HDD") 305 is used. In the present embodiment, the HDD 305 stores URLs of pages, including a page that allows a user to utilize paper purchase service therethrough and a page that allows a user to utilize ink purchase service therethrough.

The Web server 105 has a hardware configuration similar to that of the PC 103, the configuration not illustrated in a block diagram.

Figure 4:
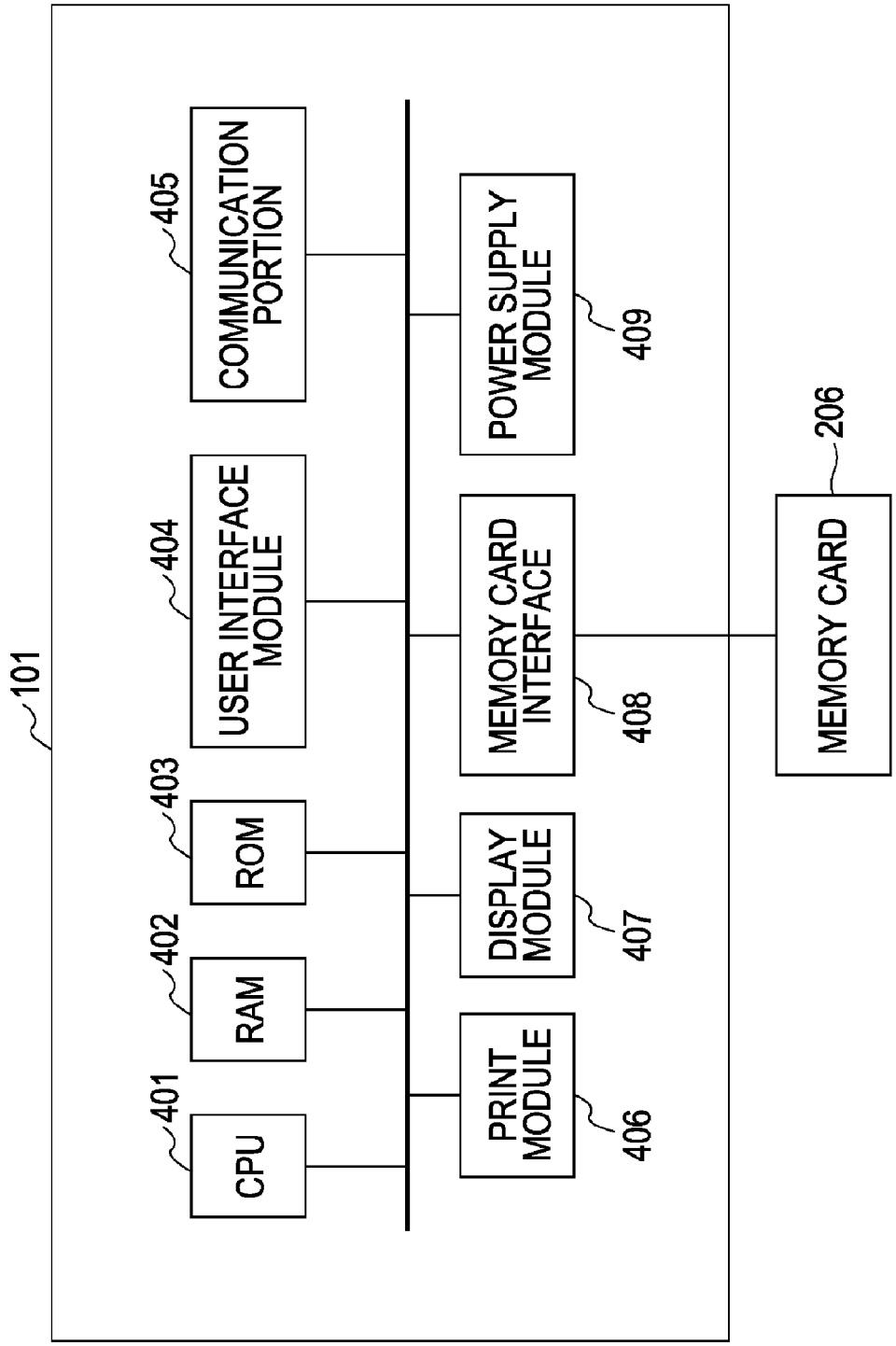
FIG. 4 illustrates a configuration of a printer according to the first embodiment of the present invention.

FIG. 4 is a block diagram that illustrates a configuration of the printer according to an embodiment of the present invention. The printer 101 according to the present embodiment can acquire an image to be printed from the memory card 206 removed from the camera 102 and attached therein or from the camera 102 connected thereto and can print the image.

The memory card 206 is attachable in the printer 101 and stores image data. When a storage medium, such as the memory card 206, is inserted into a card slot of the printer, the image data stored in the memory card can be printed.

A CPU 401 controls the entire printer 101 and performs various kinds of data calculation and processing.

A RAM 402 stores various kinds of data in performing calculation and processing by the CPU 401 and is used as a workspace therefor.

A ROM 403 stores programs executable by the CPU 401 and various kinds of data. The CPU 401 reads a necessary program from the ROM 403 and performs controls for the components and calculation in accordance with the read program.

A user interface module 404 includes an operation key, such as a power button and an image forward button. In response to receipt of an instruction input from a user through the operation key, the user interface module 404 conveys the instruction to the CPU 401. The CPU 401 controls an operation of each component in accordance with the content of the instruction from the user.

A communication portion 405 is connected to the camera 102 via a wired or radio communication interface and used in data transmission and reception.

A printer module 406 prints image data and includes an integrated circuit (IC) for controlling a head and a motor, such as a print head and a paper feed and eject motor.

A display module 407 includes an LCD and an LCD driver. The display module 407 displays, on the LCD, an image recorded on the memory card 206, a screen appearing when a user waits for startup, and a screen that allows a user to change settings of printing. The display module 407 controls display of a displayed screen of the LCD in response to an operation of an operation key (not shown) of a user.

A memory card interface 408 is used to access the memory card 206 to acquire data therefrom.

A power supply module 409 is used to supply power to the printer 101.

The hardware configuration of each device is described above. Specific operations of each device according to the present embodiment are now described below.

Figure 5:
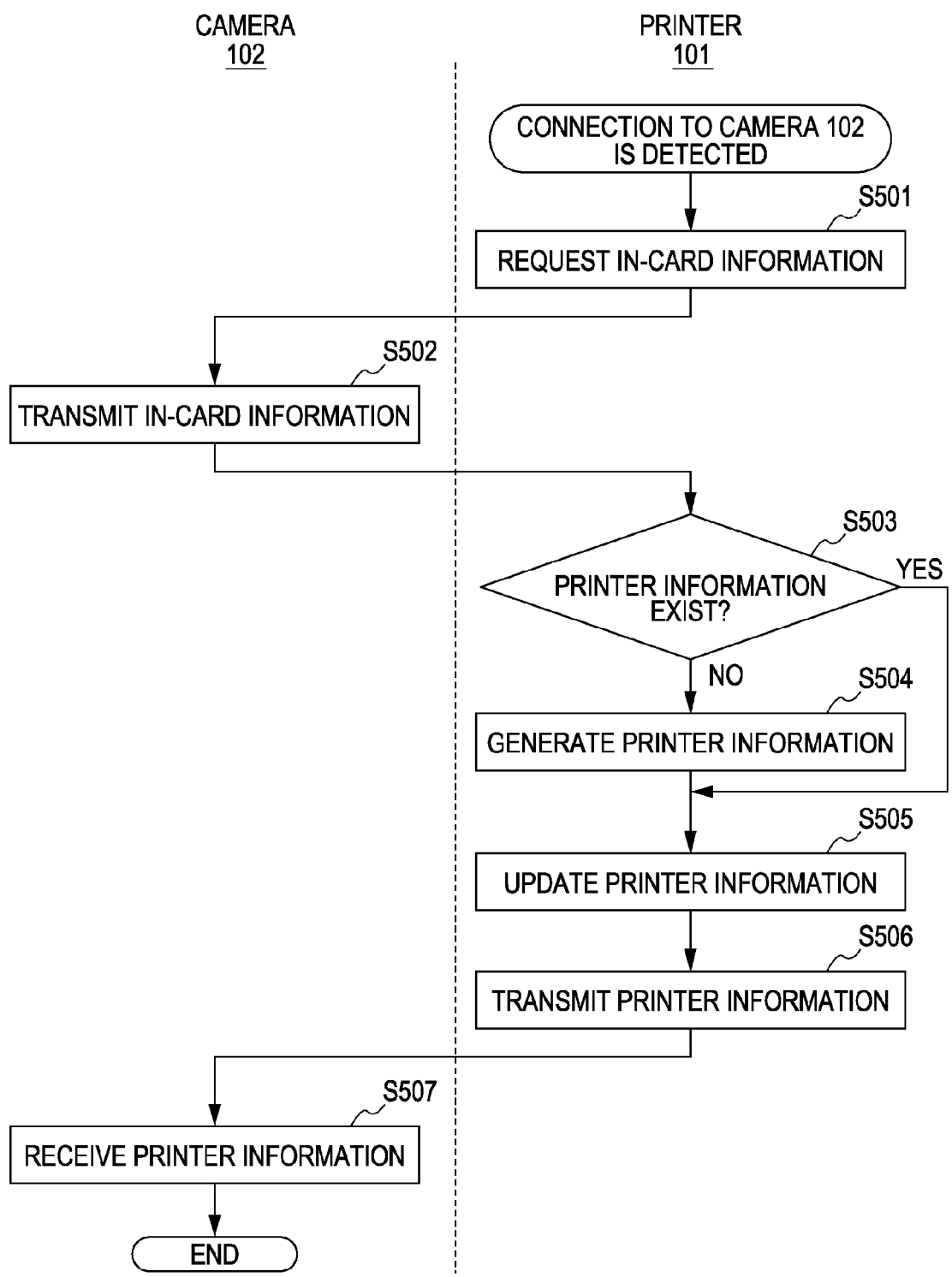
FIG. 5 is a flowchart that illustrates a process occurring when a camera and a printer are connected according to the first embodiment of the present invention.

A process occurring when the camera and the printer are connected is described below. FIG. 5 is a flowchart that illustrates a process occurring when the camera 102 and the printer 101 are connected according to the present embodiment. In FIG. 5, the right side of the dotted line indicates the process in the printer 101, and the left side of the dotted line indicates the process in the camera 102.

The flowchart illustrated in FIG. 5 is started in response to detection of a connection to the camera 102 by the printer 101.

In step S501, the printer 101 requires the camera 102 to transmit in-card information indicating the content of the memory card 206 attached in the camera 102.

In step S502, the camera 102 receives the request made in step S501 and transmits the in-card information as a reply to the request. The in-card information contains printer information.

The details of the printer information are described. The printer information indicates information on a printer connected to the camera. This information remains in the memory card in the camera even after the connection between the camera and the printer is closed.

Figure 7:
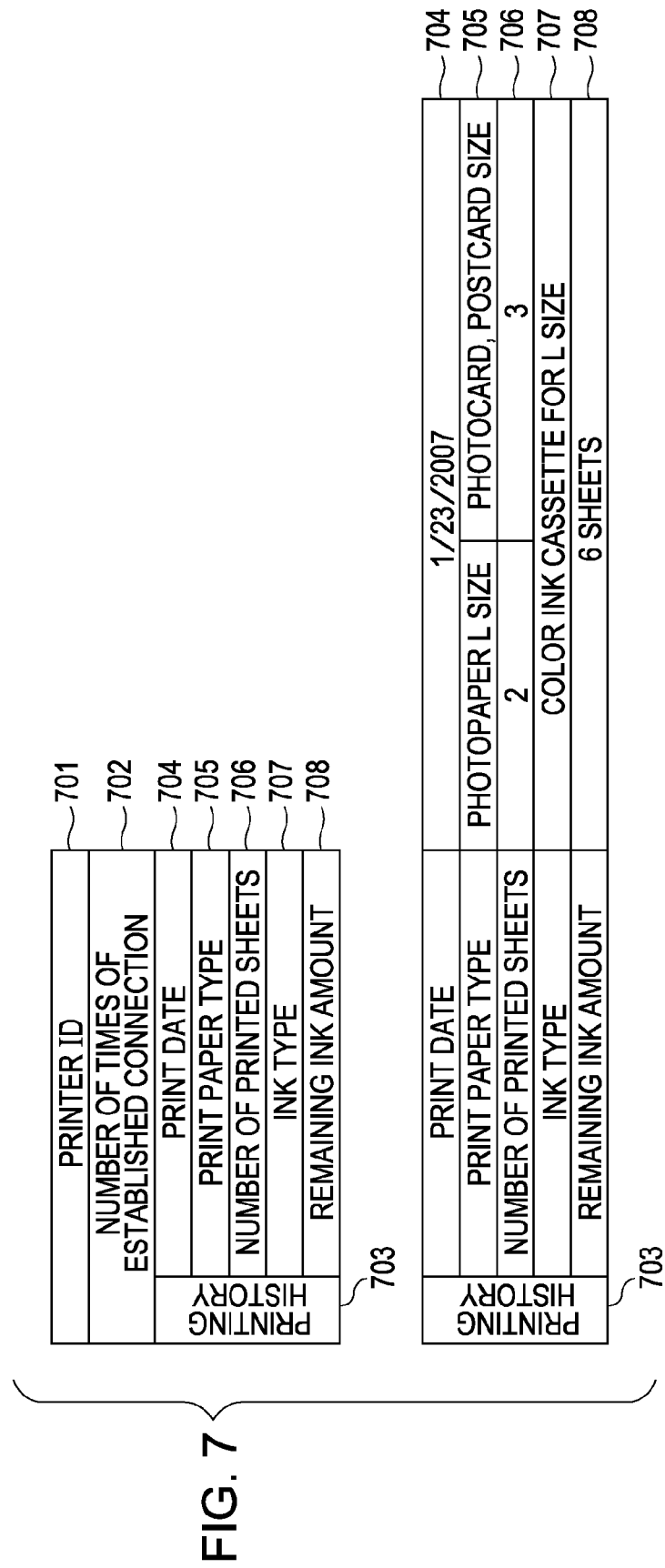
FIG. 7 illustrates printer information according to the first embodiment of the present invention.

FIG. 7 illustrates one example of the printer information. A printer ID 701 is an ID that identifies a printer connected to the camera. The ID can be determined based on a serial number or a MAC address of the printer. The printer information is generated for each printer ID 701. In the present embodiment, the model name of the printer is obtainable from the printer ID 701. For example, generating the value of the printer ID so as to contain the model name of the printer allows the model name of the printer to be obtained from the printer ID.

A number of times of established connection 702 indicate the number of times connection to the printer having the printer ID 701 is established. The occasion from when connection between the camera and the printer is detected to when the connection is closed is counted as one time.

A printing history 703 is information that indicates a history of printing performed in the printer represented by the printer ID 701 in the past. The printing history 703 is generated every time printing is performed. Accordingly, if printing is performed multiple times, the printing histories 703 corresponding to the number of the multiple times are present. The printing history 703 includes a print date 704, a print paper type 705, a number of printed sheets 706, an ink type 707, and a remaining ink amount 708. These items will be described below.

In step S503, the printer 101 receives the in-card information transmitted in step S502 and analyzes the printer information contained therein. This processing is one example in which the camera 102 functions as a first acquiring unit. In step S503, it is determined whether the printer information containing the same printer ID 701 as in the printer 101 exists. If the printer information containing the same printer ID 701 as in the printer 101 does not exist (NO in step S503), flow proceeds to step S504. If the printer information containing the same printer ID 701 as in the printer 101 exists (YES in step S503), flow proceeds to step S505.

In step S504, the printer 101 generates new printer information. As an initial value, the printer ID of the printer 101 is set to the printer ID 701 and zero is set to the number of times of established connection 702.

In step S505, the printer 101 performs processing for updating the printer information by adding one to the number of times of established connection 702 of the printer information received in step S503 or generated in step S504.

In step S506, the printer 101 transmits the updated printer information to the camera 102.

In step S507, the camera 102 receives the printer information transmitted in step S506 from the printer 101 and updates the printer information in the memory card 206.

Through the process described above, the information on the printer connected to the camera 102 and the history of connection to the printer are stored in the camera 102.

In the example illustrated in FIG. 5, the printer 101 generates the printer information and transmits it to the camera 102. Alternatively, the camera 102 may acquire various kinds of information on the printer 101 and generate and update the printer information.

Figure 6:
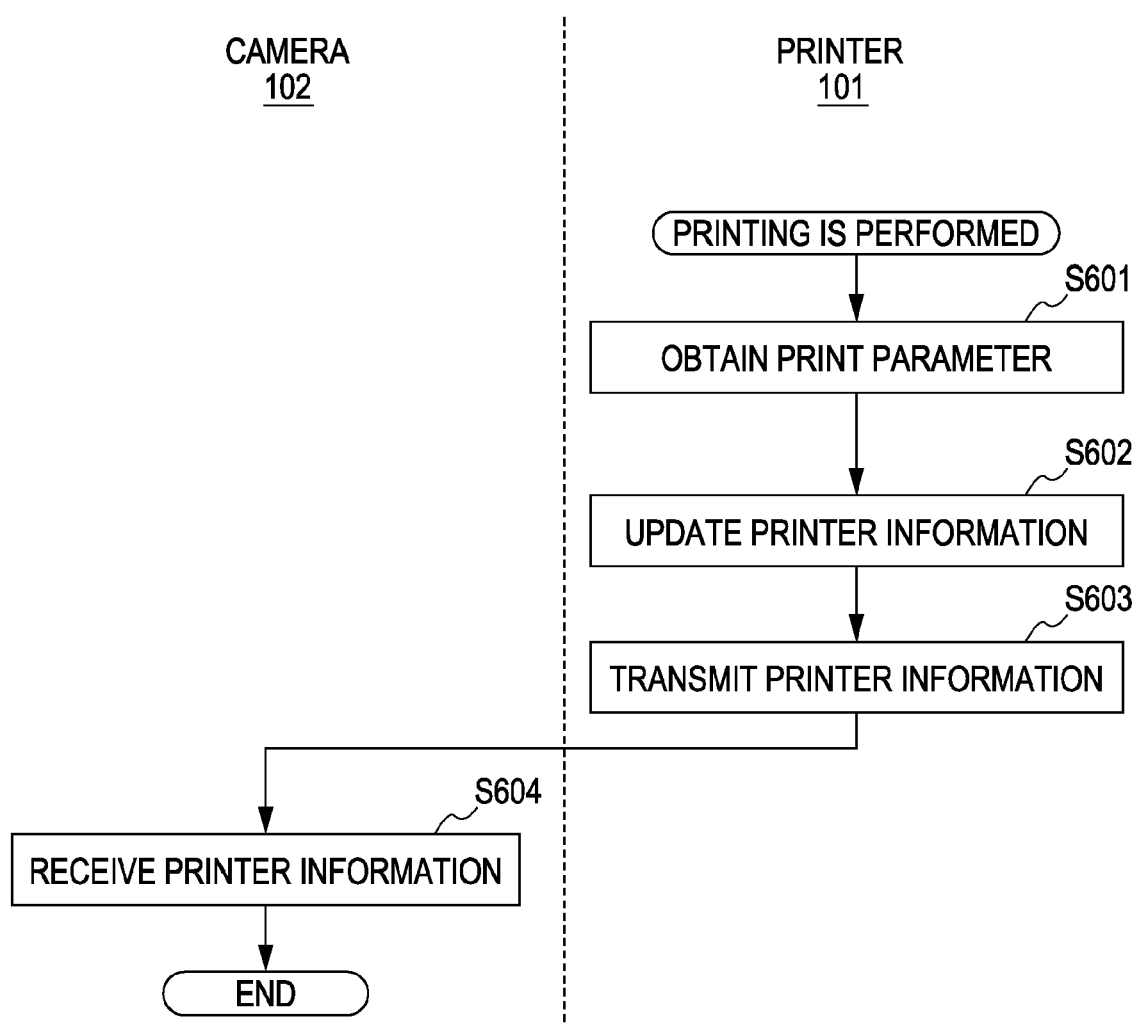
FIG. 6 is a flowchart that illustrates a process occurring when a printer executes printing according to the first embodiment of the present invention.

A process occurring when the printer 101 prints image data received from the camera 102 is described below. FIG. 6 is a flowchart that illustrates the process. In FIG. 6, the right side of the dotted line indicates the process in the printer 101, and the left side of the dotted line indicates the process in the camera 102.

The flowchart illustrated in FIG. 6 is started in response to detection of completion of printing by the printer 101.

In step S601, the printer 101 obtains a print parameter of finished printing stored in the RAM 402. The print parameter indicates the settings of the printing and the status of the printing. Examples of the print parameter include the date of the performance of the printing, the number of printed sheets, the type of paper (e.g., the properties of material), the size of paper, the type of ink cassette, the amount of sheets remaining at the completion of the printing, and the amount of ink remaining at the completion of the printing.

In step S602, the printer 101 updates the printer information in accordance with the print parameter obtained in step S601. The printing history 703 from among the items of the printer information illustrated in FIG. 7 is updated. The print date 704 of the printing history 703 indicates the date when the printing is performed. The print paper type 705 indicates the type and the size of a print sheet used in printing. The number of printed sheets 706 indicates the number of sheets that were printed. The ink type 707 indicates the type of ink cassette used in printing. Examples of the ink type 707 include a single cassette and cassettes corresponding to different colors, depending on the type of the printer. The remaining ink amount 708 can indicate various kinds of quantity, such as the number of sheets printable with the remaining ink in the case of a single ink cassette or the percentage of the remaining ink for each color in the case of ink cassettes corresponding to different colors.

Steps S603 and S604 are substantially the same as steps S506 and S507 illustrated in FIG. 5, so the detailed description thereof is not repeated here.

As described above, in the present embodiment, when the printer 101 performs printing, the printer information is automatically updated, and the updated printer information is transmitted to the camera 102. This enables the memory card 206 in the camera 102 to maintain the latest printer information.

At the time when printed matter is output by printing, the connection between the printer 101 and the camera 102 may be closed by an operation of a user, such as removal of a cable. To avoid such an event, the printer 101 according to the present embodiment may display, on the display module 407, an indication that says "Please not close the connection" up to when the printer information is transmitted in step S506. Similarly, the camera 102 may also display, on the display portion 207, an indication that says "Please not close the connection" up to when the printer information is received in step S507.

Figure 8:
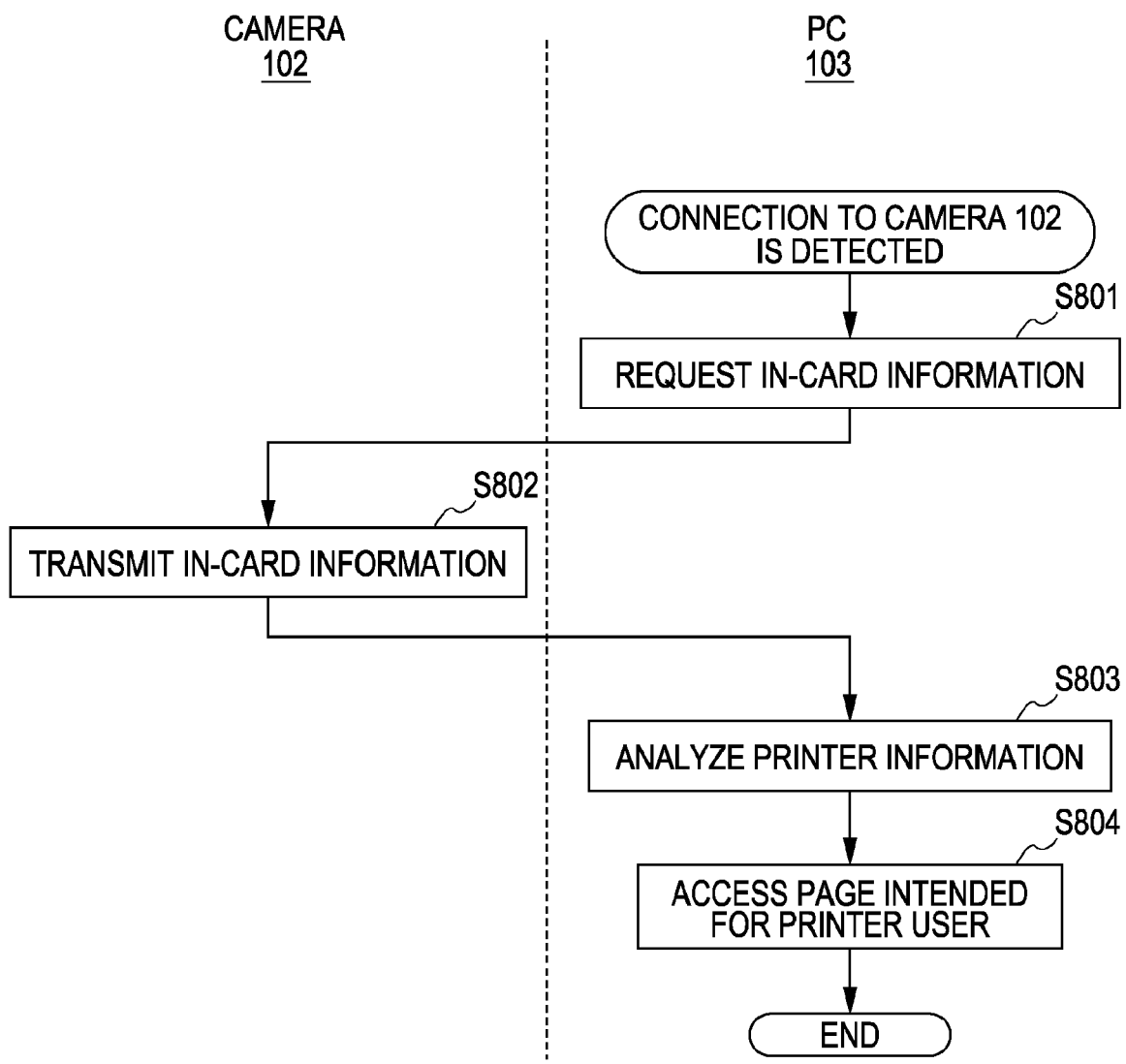
FIG. 8 is a flowchart that illustrates a process occurring when a camera and a PC are connected according to the first embodiment of the present invention.

A process occurring when the camera 102 and the PC 103 are connected is described below with reference to the flowchart illustrated in FIG. 8. In FIG. 8, the right side of the dotted line indicates the process in the PC 103, and the left side of the dotted line indicates the process in the camera 102.

The flowchart illustrated in FIG. 8 is started by the PC 103 launching an application in response to detection of establishment of connection to the camera 102.

In step S801, the PC 103 requires the camera 102 to transmit in-card information.

In step S802, the camera 102 receives the request made in step S801 and transmits the in-card information as a reply to the request to the PC 103. The in-card information contains printer information.

In step S803, the PC 103 receives the in-card information and analyzes the printer information contained in the in-card information.

In step S804, the PC 103 connects to the Web server 105 in accordance with the analysis of the printer information and accesses a page targeted for a user of the printer.

Figure 9:
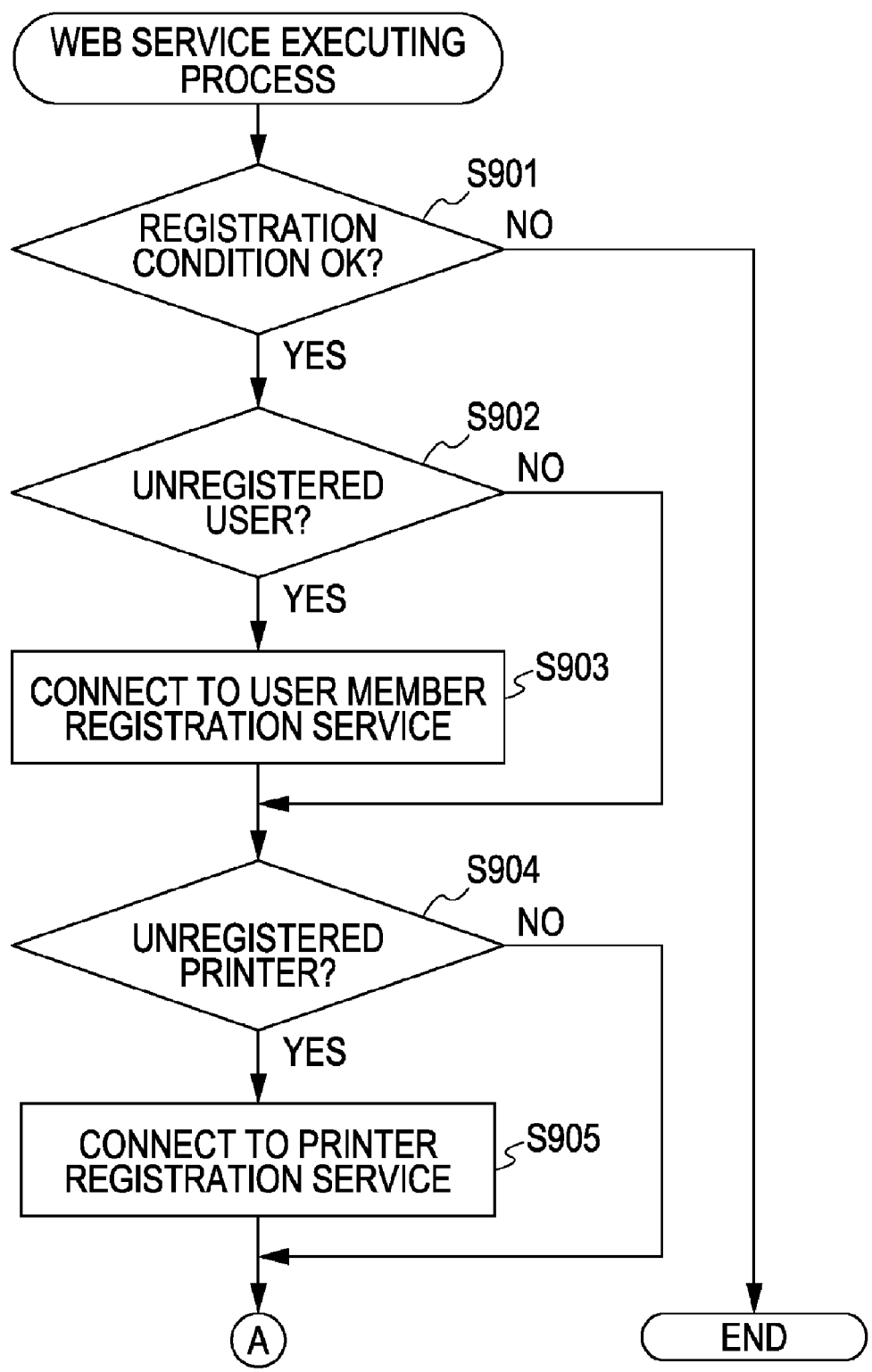
FIG. 9 is a flowchart that illustrates a process for executing Web service according to the first embodiment of the present invention.
Figure 10:
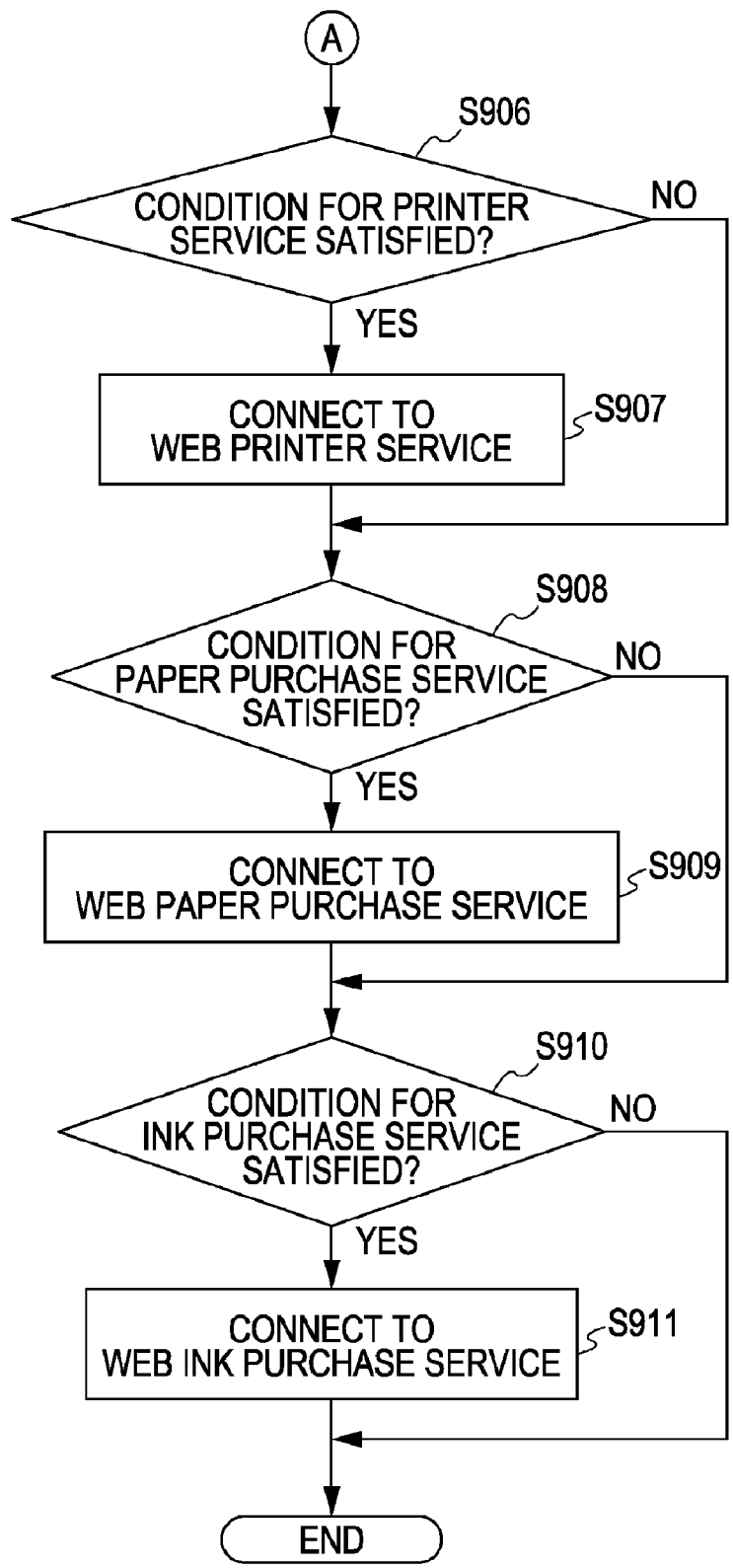
FIG. 10 is a flowchart that illustrates the process for executing Web service according to the first embodiment of the present invention.

A process for analyzing the printer information in step S803 and accessing a page in accordance with the analysis in step S804 is described. FIGS. 9 and 10 are flowcharts that illustrate processing performed by the PC 103 in that process.

In step S901, the PC 103 determines whether the printer 101 satisfies a condition for registration with the Web server 105. Specifically, the PC 103 makes the determination by comparing the model name contained in the printer information with a list of models that can be registered with the Web server, the list being stored on the HDD 305. If the printer 101 is a model that can be registered with the Web server (YES in step S901), the PC 103 refers to the number of times of established connection 702 contained in the printer information to determine whether the number of times of established connection is equal to or larger than a predetermined number. If the number of times of established connection is equal to or larger than the predetermined number, for example, five, the PC 103 determines that the registration condition is satisfied. This aims to prevent a printer of another person that has been connected to the camera of the user only once from being registered with the Web server 105. If the PC 103 determines that the registration condition is satisfied (YES in step S901), flow proceeds to step S902. If the PC 103 determines that the registration condition is not satisfied (NO in step S901), the process is completed.

In step S902, the PC 103 determines whether the user of the PC 103 has been registered with the Web server 105. Specifically, for example, the PC 103 can store information indicating whether the user is registered or unregistered on the HDD 305 in advance and refer to the information in this step to make the determination. The registration of the user here indicates registration that does not depend on the device of the user and that is performed for each user. To register the device, the user should be registered. If the PC 103 determines that the user is an unregistered user (YES in step S902), flow proceeds to step S903. If the PC 103 determines that the user is a registered user (NO in step S902), flow proceeds to step S904.

In step S903, the PC 103 automatically reads a page where the user can be registered from the HDD 305, connects to the Web server 105, and accesses the page where the user can be registered. The PC 103 acquires the Web page and controls the display portion 301 to display a screen that allows the user to be registered, thus displaying the Web page used for registration on the display portion 301. The user can recognize that the printer 101 can be registered with the Web server 105 by seeing the displayed screen. When the user inputs a necessary item, such as the user ID, the PC 103 transmits the information to the Web server 105 and the registration of the user is completed.

In step S904, the PC 103 determines whether the printer 101 has been registered with the Web server 105. Specifically, for example, the PC 103 can store a printer ID of a registered printer on the HDD 305 in advance and refer to the information in this step to make the determination. If the PC 103 determines that the printer 101 is an unregistered printer (YES in step S904), flow proceeds to step S905. If the PC 103 determines that the printer 101 is a registered printer (NO in step S904), flow proceeds to step S906.

In step S905, the PC 103 automatically reads a page where the printer can be registered from the HDD 305, connects to the Web server 105, and accesses the page where the printer can be registered. In this process flow, similar processing is performed even when the PC 103 accesses other pages. The PC 103 acquires the Web page and controls the display portion 301, thus displaying the Web page used for registration of the printer on the display portion 301. The user can recognize that the printer 101 can be registered with the Web server 105 by seeing the displayed screen. When the user inputs a necessary item, such as the model name of the printer, the PC 103 transmits the information to the Web server 105 and the registration of the printer is completed. The Web server 105 stores the information input in the user registration and the information input in the printer registration in association with each other.

In step S905, the PC 103 can also automatically transmit printer information received from the camera 102 to the Web server 105, and the Web server 105 can register the printer information. This processing is one example in which the PC 103 functions as a second transmitting unit. The printer 101 can automatically register with the Web server 105 without a user operation of an input of a necessary item.

The process flow for registering the printer with the Web server 105 is described above. A process for providing service that the user of the registered printer can receive is described below with reference to step S906 and subsequent steps.

Once the user registration and the printer registration have been completed, the PC 103 will be able to log into the Web service by transmitting the user ID to the Web server 105. The Web server 105 reads the user ID of the user who logs in and acquires the model name and other information of the printer associated with the user ID. The Web server 105 transmits a Web page for providing Web service that matches the registered printer to the PC 103. The PC 103 can receive Web service that matches the printer 101.

The PC 103 can also receive Web service for the printer by the way described below.

In step S906 illustrated in FIG. 10, the PC 103 determines whether the printer service is available. The details will be described below. If the PC 103 determines that the printer service is available (YES in step S906), flow proceeds to step S907. If the PC 103 determines that the printer service is not available (NO in step S906), flow proceeds to step S908.

Figure 11:
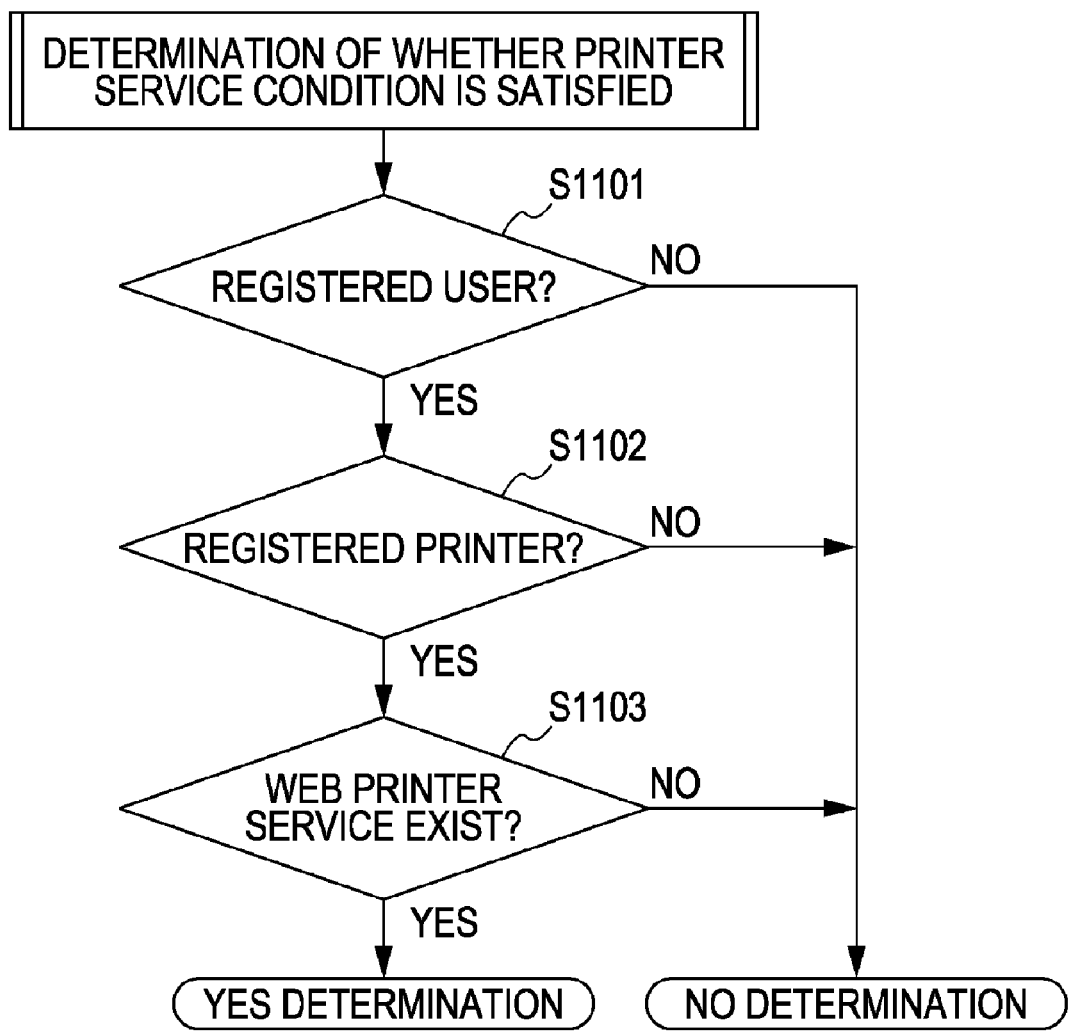
FIG. 11 is a flowchart that illustrates a process for determining a condition for printer service according to the first embodiment of the present invention.

The determination process in step S906 is described using the flowchart illustrated in FIG. 11.

In step S1101, the PC 103 determines whether the current user of the PC 103 is registered with the Web server 105. If the PC 103 determines that the current user is a registered user (YES in step S1101), flow proceeds to step S1102. If the PC 103 determines that the current user is not a registered user (NO in step S1101), "NO" is determined in step S906 illustrated in FIG. 10.

In step S1102, the PC 103 compares the printer information with information stored on the HDD 305 and determines whether the printer 101 is a printer registered with the Web server 105 as a result of the processing of step S905. If the PC 103 determines that the printer 101 is a registered printer (YES in step S1102), flow proceeds to step S1103. If the PC 103 determines that the printer 101 is not a registered printer (NO in step S1102), "NO" is determined in step S906 illustrated in FIG. 10.

In step S1103, the PC 103 accesses the Web server 105 and determines whether printer service for the printer 101 exists. The printer service may include service for providing driver updating information, updating of contents, specification guiding, bug information, and useful functions through a Web page.

Specifically, in step S1103, the PC 103 accesses the Web server 105 and inquires about whether the printer service for the model of the registered printer 101 exists. In the present embodiment, at the time of printer registration, the model name of the printer 101 is registered with the Web server 105 as a necessary item. The Web server 105 determines whether or not to provide printer service that matches the printer 101 and what kind of printer service can be provided in accordance with the model name of the registered printer 101 and transmits information indicating the determined results to the PC 103. The PC 103 determines whether printer service for the printer 101 exists in accordance with the transmitted information. In step S1103, the PC 103 may acquire information on printer service that matches the printer 101 by transmitting the model name of the printer 101 to the Web server 105.

If the PC 103 determines that such printer service exists (YES in step S1103), "YES" is determined in step S906 illustrated in FIG. 10. If the PC 103 determines that such printer service does not exist (NO in step S1103), "NO" is determined in step S906 illustrated in FIG. 10.

In step S1101, where it is determined whether the user is a registered user, alternatively, the printer service may be provided irrespective of whether the user is a registered user. In this case, the determination in step S1101 is always "YES" and step S1102 is always performed.

Similarly, in step S1102, where it is determined whether the printer is a registered printer, alternatively, the printer service may be provided irrespective of whether the printer is a registered printer. In this case, the determination in step S1102 is always "YES" and step S1103 is always performed.

Referring back to FIG. 10, in step S907, the PC 103 connects to the Web server 105 and accesses a page that allows the user to utilize the printer service therethrough. The PC 103 acquires the Web page and controls the display portion 301, thus displaying the Web page that allows the user to utilize the printer service therethrough on the display portion 301. The user can recognize that the printer service is available by seeing the displayed screen.

In step S908, the PC 103 determines whether or not to connect to paper purchase service. The details of this determination process will be described below. If the PC 103 is to connect to the paper purchase service (YES in step S908), flow proceeds to step S909. If the PC 103 is not to connect to the paper purchase service (NO in step S908), flow proceeds to step S910.

Figure 12:
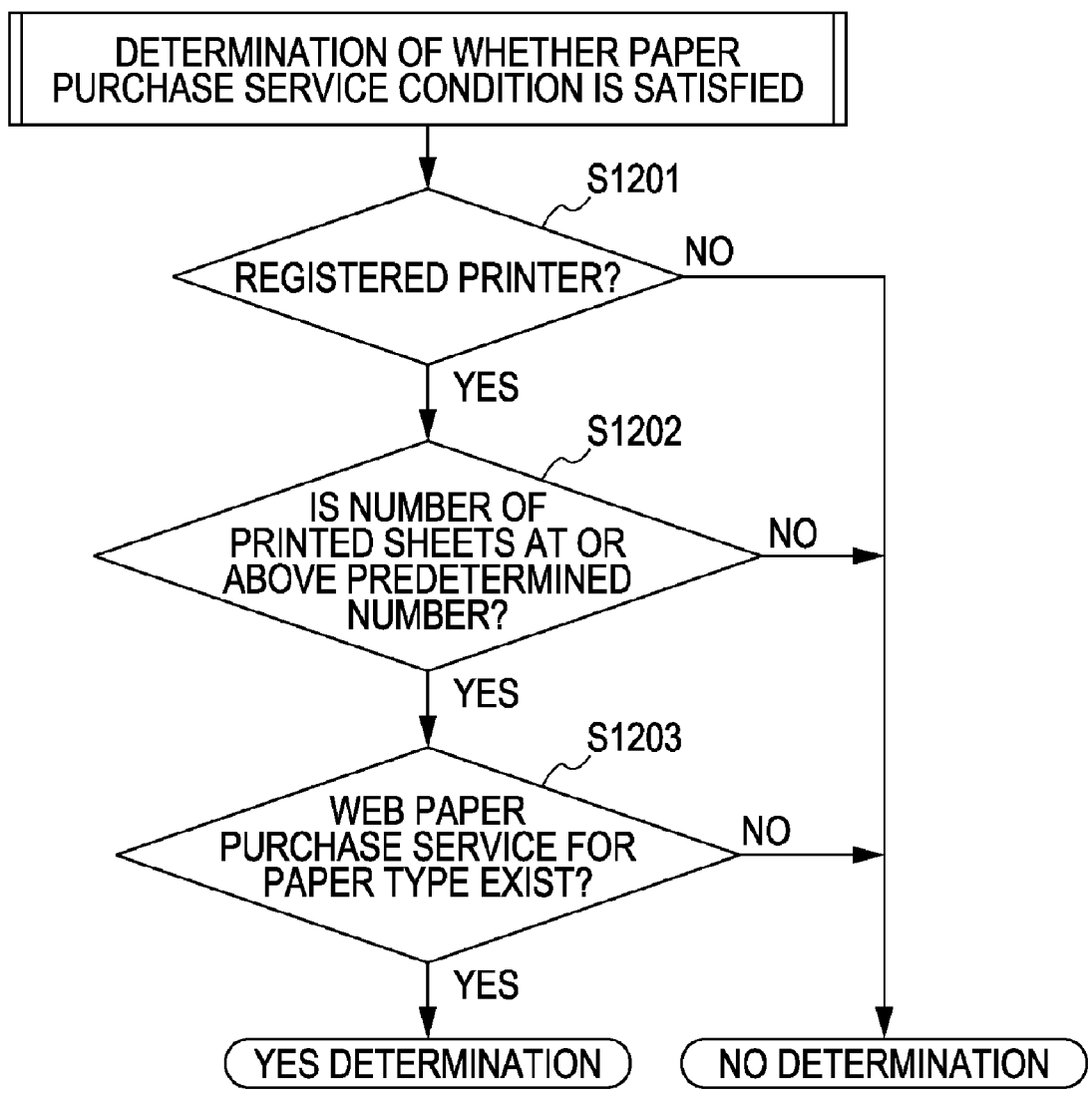
FIG. 12 is a flowchart that illustrates a process for determining a condition for paper purchase service according to the first embodiment of the present invention.

The determination process in step S908 is described using the flowchart illustrated in FIG. 12.

In step S1201, the PC 103 determines whether the printer 101 is registered with the Web server 105. If the PC 103 determines that the printer 101 is a registered printer (YES in step S1201), flow proceeds to step S1202. If the PC 103 determines that the printer 101 is not a registered printer (NO in step S1201), "NO" is determined in step S908 illustrated in FIG. 10.

In step S1202, the PC 103 determines whether the number of printed sheets 706 being the cumulative total up to now is equal to or larger than a predetermined number. The number of printed sheets being the cumulative total is determined for each type of print paper. If the number of printed sheets being the cumulative total for each of all types of paper is a predetermined number (YES in step S1202), flow proceeds to step S1203. If the number of printed sheets being the cumulative total for at least one type of paper is smaller than a predetermined number (NO in step S1202), "NO" is determined in step S908.

In step S1202, the PC 103 can determine insufficient paper in the printer 101.

In step S1203, the PC 103 accesses the Web server 105 and makes an inquiry to determine whether Web service for selling paper that is determined as being insufficient in step S1202 exists. If the PC 103 determines that such Web service exists (YES in step S1203), "YES" is determined in step S908; if the PC 103 determines that no such Web service exists (NO in step S1203), "NO" is determined in step S908.

Referring back to FIG. 10, in step S909, the PC 103 connects to the Web server 105 and accesses a page that allows the user to utilize the paper purchase service therethrough.

The PC 103 acquires the Web page and controls the display portion 301 to display a screen that allows the user to utilize paper purchase service therethrough, thus displaying the Web page for paper purchase on the display portion 301. The user can recognize that the paper purchase service is available and also recognize that the remaining amount of paper in the printer 101 is small by seeing the displayed screen. The user can purchase paper for use in the printer 101 by performing an operation in accordance with instructions of the displayed page.

In the printer information of the present embodiment, the number of printed sheets is set for each paper type, as illustrated in FIG. 7. Accordingly, the PC 103 refers to the printing history 703 and determines whether the amount of usage of paper for each paper type exceeds a predetermined number. If the predetermined number is exceeded, the PC 103 can access a page that allows the user to purchase the print paper therethrough.

In step S910, the PC 103 determines whether or not to connect to ink purchase service. The details of this process will be described below. If the PC 103 is to connect to the ink purchase service (YES in step S910), flow proceeds to step S911. If the PC 103 is not to connect to the ink purchase service (NO in step S910), the process is completed.

Figure 13:
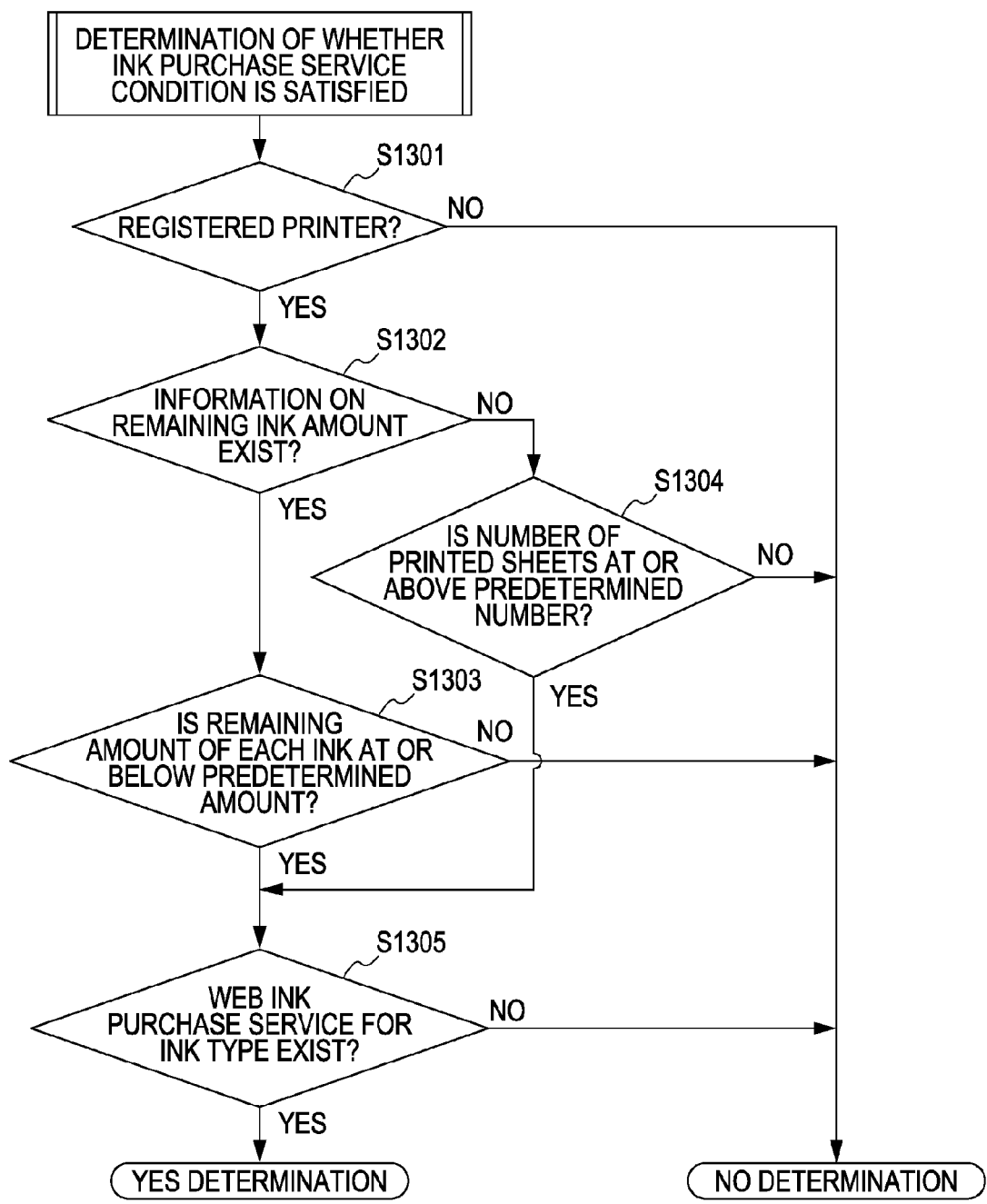
FIG. 13 is a flowchart that illustrates a process for determining a condition for ink purchase service according to the first embodiment of the present invention.

The determination process in step S910 is described using the flowchart illustrated in FIG. 13.

In step S1301, the PC 103 determines whether the printer 101 is registered with the Web server 105. If the PC 103 determines that the printer 101 is a registered printer (YES in step S1301), flow proceeds to step S1302. If the PC 103 determines that the printer 101 is not a registered printer (NO in step S1301), "NO" is determined in step S910 illustrated in FIG. 10.

In step S1302, the PC 103 refers to the printer information and determines whether the value of the remaining ink amount 708 exists. Because no ink remaining amount may be measured depending on the printer, the determination is made at this step.

In step S1303, the PC 103 refers to the printer information and determines whether the remaining ink amount 708 is equal to or smaller than a predetermined amount. If the PC 103 determines that the remaining ink amount 708 is equal to or smaller than the predetermined amount (YES in step S1303), flow proceeds to step S1305. If the PC 103 determines that the remaining ink amount 708 exceeds the predetermined amount (NO in step S1303), "NO" is determined in step S910. In the case where the ink type is a cassette for each color, the determination is made for each ink color.

In step S1304, the PC 103 refers to the number of printed sheets 706 and determines whether the number of printed sheets is equal to or larger than a predetermined number. If the PC 103 determines that the number of printed sheets is equal to or larger than the predetermined number (YES in step S1304), it is determined that the remaining ink amount is small, and flow proceeds to step S1305.

In steps S1303 and S1304, the PC 103 can determine insufficient ink in the printer 101.

In step S1305, the PC 103 accesses the Web server 105 and makes an inquiry to determine whether Web service for selling an ink cassette that is determined as being insufficient in step S1303 or S1304 exists. If the PC 103 determines that such Web service exists (YES in step S1305), "YES" is determined in step S910; if the PC 103 determines that no such Web service exists (NO in step S1305), "NO" is determined in step S910.

Referring back to FIG. 10, in step S911, the PC 103 connects to the Web server 105 and accesses a page that allows the user to utilize the ink purchase service therethrough. The user can also purchase an ink cassette for use in the printer 101 through this page, similar to the paper purchase service.

In the present embodiment, the list of models that can be registered with the Web server 105 and information indicating whether the user registration and the printer registration are made are stored on the HDD 305. According to another embodiment, this kind of information may be stored in the Web server 105, and the PC 103 may access the Web server 105 and retrieve the information on an as needed basis. The PC 103 transmits, to the Web server 105, a request for acquiring information that indicates whether the user registration and the printer registration are made together with the user ID and the printer ID. The Web server 105 receiving the request for acquiring the information determines whether the user ID and the printer ID transmitted from the PC 103 have been registered and transmits the determination to the PC 103.

The camera 102 according to the present embodiment receives printer information when connected to the printer 101 and transmits printer information to the PC 103 when connected to the PC 103. The PC 103 according to the present embodiment registers the printer 101 with the Web server 105 in accordance with the printer information received from the camera 102.

Accordingly, even with a printer that has no occasion to directly connect to a PC, a user can register the printer 101 with the Web server 105 and thus can receive various kinds of services targeted for printer users.

The PC 103 controls access to a page in accordance with the status of the printer 101 by acquiring information on the ink or paper of the printer 101 registered with the Web server 105. Accordingly, the user can receive Web service that matches the status of the printer 101.

It is not required for the PC 103 to automatically connect to the Web server 105, for example, unlike in step S905. An indication that the printer 101 can be registered with the Web server 105 or Web service is available may be informed by a pop-up display. The user may be prompted to register the printer 101 with the Web server 105 or to utilize the Web service therethrough.

The PC 103 may also transmit determination in any one of steps S906, S908, and S910 to the Web server 105. The Web server 105 can transmit a page that displays a banner advertisement in accordance with the determination to the PC 103.

A second embodiment is described next. In the first embodiment, the PC 103 acquires printer information on the printer 101 and performs control in accordance with the printer information to register with the Web server 105 or receive Web service.

However, for the first embodiment, because the PC 103 needs to have the capability to interpret the printer information, it may be necessary to install a special application in the PC 103.

In the present embodiment, the user can easily receive Web service without having to install such a special application in the PC 103.

The present embodiment is similar to the first embodiment. The portions common to the first embodiment are not described here, and the description focused on a portion unique to the present embodiment is provided below.

FIG. 14 is a flowchart that illustrates a process occurring when the printer 101 and the camera 102 are connected according to the present embodiment. In FIG. 14, the right side of the dotted line indicates the process in the printer 101, and the left side of the dotted line indicates the process in the camera 102.

The flowchart illustrated in FIG. 14 is started in response to detection of establishment of a connection to the camera 102 by the printer 101.

The processing of step S1401 through step S1404 is substantially the same as that of step S501 through step S504, so the description thereof is not repeated here.

In step S1405, the printer 101 analyzes the printer information. Specifically, the printer 101 makes determination of an insufficiency of paper or ink through, for example, the process illustrated in FIG. 10.

In step S1406, the printer 101 generates a file that contains information about a link to a page targeted for a printer user in the Web server 105 in accordance with the analysis in step S1405. In the present embodiment, the printer 101 generates a hypertext markup language (HTML) file, which is one type of a page description file that can be viewed by use of Web browsing software. In the present embodiment, the URL of a page that allows a user to utilize paper purchase service therethrough or the URL of a page that allows a user to utilize ink purchase service therethrough are stored in advance in the ROM 403 in the printer 101. Accordingly, the generated HTML file contains information about a link to the page allowing the paper purchase service therethrough if the status of the printer 101 is an insufficiency of paper and contains information about a link to the page allowing the ink purchase service therethrough if the status of the printer 101 is an insufficiency of ink.

In step S1407, the printer 101 transmits the HTML file generated in step S1406 to the camera 102.

In step S1408, the camera 102 receives the HTML file and stores it in the memory card 206.

The memory card 206 in the camera 102 stores an HTML file that contains information about a link used to utilize service for the printer 101.

Accordingly, the PC 103 can access a page that allows a user to utilize service for the printer 101 therethrough by accessing the memory card 206 in the camera 102, opening the HTML file, and acquiring the link information. When the PC 103 and a mass-storage camera are connected, the PC 103 can access the page that allows the user to utilize service for the printer 101 using a regular browser. It is unnecessary for the PC of the user to have a particular application. FIGS. 15A and 15B illustrate an example screen appearing when an HTML file that contains a link to a page that allows a user to utilize paper purchase service for printer users therethrough and an example screen appearing when an HTML file that contains a link to a page that allows a user to utilize ink purchase service for printer users therethrough, respectively.

In the example illustrated in FIG. 14, the printer 101 generates an HTML file and transmits it to the camera 102. Alternatively, the camera 102 may acquire information on the printer 101 and generate an HTML file.

In a third embodiment, both the camera 102 and the printer 101 can recognize that the printer 101 has been registered with the Web server 105. The present embodiment is similar to the first and second embodiments. The portions common to the first and second embodiments are not described here, and the description focused on a portion unique to the present embodiment is provided below.

A process occurring when the camera and the printer are connected is described below. FIG. 16 is a flowchart that illustrates a process occurring when the printer 101 and the camera 102 are connected according to the present embodiment. In FIG. 16, the right side of the dotted line indicates the process in the printer 101, and the left side of the dotted line indicates the process in the camera 102.

The present embodiment handles registration information indicating the state of registration of the printer with the Web server 105. FIG. 17 illustrates one example of the registration information. As illustrated in FIG. 17, a printer ID 1701 indicating an ID of a printer registered with the Web server 105 and a user ID 1702 indicating an ID used to identify a registered user are stored in association with each other in registration information 1700. The details of exchange of the registration information will be described below.

The flowchart illustrated in FIG. 16 is started in response to detection of a connection to the camera 102 by the printer 101.

In step S1601, the printer 101 requires the camera 102 to transmit in-card information indicating the content of the memory card 206 attached in the camera 102.

In step S1602, the camera 102 receives the request made in step S1601 and transmits the in-card information as a reply to the request. The in-card information according to the present embodiment contains printer information and also contains, if registration information exists in the memory card 206, registration information. This processing is one example in which the camera 102 functions as a second transmitting unit.

The processing of step S1603 through step S1607 is substantially the same as that of step S503 through step S507 illustrated in FIG. 5, so the description thereof is not repeated here.

In step S1608, the printer 101 updates the registration information. A process for updating registration information is described below using FIG. 18.

FIG. 18 is a flowchart that illustrates a process for updating registration information. Although illustrated as processing performed in the printer 101 in FIG. 16, this processing is data exchange between the printer 101 and the camera 102 in actuality. In FIG. 18, the right side of the dotted line indicates the process in the printer 101, and the left side of the dotted line indicates the process in the camera 102.

In step S1801, the printer 101 refers to the ROM 403 in the printer 101 and determines whether the registration information is already stored in the printer 101. If no registration information is stored in the printer 101 (NO in step S1801), flow proceeds to step S1802. If the registration information is stored in the printer 101 (YES in step S1801), flow proceeds to step S1804.

In step S1802, the printer 101 determines whether the registration information is stored in the camera 102. Specifically, the in-card information transmitted in step S1602 illustrated in FIG. 16 is referred to, and it is determined whether the in-card information contains the registration information. If the registration information is stored (YES in step S1802), flow proceeds to step S1803. If no registration information is stored (NO in step S1802), the process is completed.

In step S1803, the printer 101 extracts an item that includes the printer ID of the printer 101 from the registration information contained in the in-card information and stores it as new registration information in the ROM 403. The printer 101 can recognize that the printer 101 has been registered with the Web server 105.

Where it is determined in step S1801 that the registration information is stored in the printer 101 (YES in step S1801) is described next. One example of this case is a case where the processing in step S1803 was performed.

In step S1804, the printer 101 transmits the registration information stored in the ROM 403 to the camera 102.

In step S1805, the camera 102 receives the registration information transmitted in step S1804 and updates a corresponding printer item. The process is completed.

A reason for the processing in steps S1804 and S1805 is performed is described below. If the memory card 206 of the camera 102 is replaced with a blank memory card after step S1803, the registration information is stored in the printer 101, whereas the camera 102 has no registration information. To address this situation, when the printer 101 has registration information, the printer 101 transmits the registration information to the camera 102.

A process occurring when the camera 102 and the PC 103 are connected is described below with reference to the flowchart illustrated in FIG. 19. In FIG. 19, the right side of the dotted line indicates the process in the PC 103, and the left side of the dotted line indicates the process in the camera 102.

The flowchart illustrated in FIG. 19 is started by the PC 103 launching an application in response to detection of a connection to the camera 102.

The processing in steps S1901 and S1902 is substantially the same as that in steps S801 and S802 illustrated in FIG. 8, so the description thereof is not repeated here.

In step S1903, the PC 103 receives the in-card information and analyzes printer information and registration information contained in the in-card information.

In step S1904, the PC 103 connects to the Web server 105 in accordance with the analysis of the printer information and accesses a page targeted for a user of the printer. This processing is substantially the same as that illustrated in FIGS. 9 and 10. The determination of whether registration has been made can be performed in accordance with the registration information contained in the in-card information.

In step S1905, the PC 103 determines whether the registration information has been updated as a result of accessing a page targeted for a printer user. Specifically, the PC 103 receives the current registration information from the Web server 105 and determines whether there is a difference between the received registration information and the registration information stored in the PC 103. If the PC 103 determines that updating has been made (YES in step S1905), flow proceeds to step S1906. If the PC 103 determines that updating has not been made (NO in step S1905), the process is completed.

In step S1906, the PC 103 transmits the updated registration information to the camera 102. This processing is one example in which the PC 103 functions as a first transmitting unit.

In step S1907, the camera 102 receives the registration information, and the process is completed. This processing is one example in which the camera 102 functions as a second acquiring unit.

In the present embodiment, the printer 101 may generate an HTML file. The printer 101 can store registration information. Accordingly, the printer 101 can generate an HTML file that contains a link to a Web page used for registration. If printer information does not contain registration information, the printer 101 can generate an HTML file that contains a link to a Web page used for registration of the printer and transmit the HTML file to the camera 102. The PC 103 can access the Web page used for registration of the printer by accessing the camera 102 and referring to the HTML file.

One example of a screen appearing when the PC 103 refers to the HTML file containing the Web page used for registration is illustrated in FIG. 15C.

As described above, according to the present embodiment, at least one of the printer 101 and the camera 102 can store registration information. Accordingly, a proper Web page can be accessed in accordance with the registration information. It is not necessary for the PC 103 to store and manage the registration information. Thus, each of the printer 101 and the camera 102 can inform the Web server of the status of the printer 101 when connected to any PC. If the printer 101 stores registration information, the printer 101 can inform the Web server of the status of the printer 101 when connected to any camera.

In the first to third embodiments, the description is provided, assuming that the camera 102 and the printer 101 are directly connected or that the camera 102 and the PC 103 are directly connected. However, it is not required to directly connect these devices. Printer information and registration information may be exchanged through the insertion and extraction of the memory card 206 with respect to these devices.

Each of the above embodiments is merely an example for carrying out the present invention. The present invention is not limited to the above embodiments. Any combination of the above embodiments may be made.

The present invention is also achievable by the provision of a storage medium that stores program code of software for carrying out the functions of any of the above embodiments to a system or an apparatus. The present invention is also achievable by a computer of the system or the apparatus (CPU or microprocessor unit (MPU)) reading and executing the program code stored on the storage medium.

The program code read from the storage medium achieves the functions of any of the above embodiments. Thus, the storage medium that stores the program code can also be included in the present invention.

Examples of the storage medium used for supplying the program code include a floppy disk, a hard disk, an optical disk, a magneto-optical disk, a compact-disk read-only memory (CD-ROM), a CD-recordable (CD-R), magnetic tape, a non-volatile semiconductor memory card, and a ROM. The functions of any of the above embodiments may also be achieved by the computer executing the read program code.

The functions of any of the above embodiments are also achievable by execution of actual processing in part or in entirety by an operating system (OS) running on the computer in accordance with instructions of the program code.

Furthermore, the functions of any of the above embodiments are also achievable by writing of the program code read from the storage medium into memory included in a function expansion board inserted in the computer or a function expansion unit connected to the computer and execution of actual processing in part or in entirety by the CPU included in the function expansion board or function expansion unit.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-106801 filed Apr. 16, 2008, which is hereby incorporated by reference herein in its entirety.

What is claimed is:

1. An information processing apparatus connectable to an image pickup device and a server device, the image pickup device being connectable to a printer, the information processing apparatus comprising:

an acquiring unit that acquires printer information indicating information on a printer connected to the image pickup device if the information processing apparatus is connected to the image pickup device;

a determining unit that determines whether the printer indicated by the printer information acquired by the acquiring unit can be registered with the server device; and a display control unit that displays, on a display unit, an indication that the printer indicated by the printer information can be registered with the server device if the determining unit determines that the printer indicated by the printer information can be registered with the server device, wherein the printer information contains a number of times of established connection between the image pickup device and the printer, and the determining unit determines whether the printer indicated by the printer information can be registered with the server device by determining whether the number of times of established connection is equal to or larger than a predetermined number.

2. The information processing apparatus according to claim 1, wherein the determining unit determines whether the printer indicated by the printer information can be registered with the server device by determining whether the printer indicated by the printer information has been registered with the server device.

3. The information processing apparatus according to claim 1, wherein the acquiring unit further acquires, from the image pickup device, registration information indicating a state of registration of the printer with the server device, and the determining unit determines whether the printer indicated by the printer information has been registered with the server device based upon the registration information.

4. The information processing apparatus according to claim 1, further comprising:

a first transmitting unit that transmits, to the image pickup device, registration information indicating a state of registration of the printer with the server device if the information processing apparatus is connected to the image pickup device.

5. The information processing apparatus according to claim 4, further comprising:

a second transmitting unit that transmits the printer information acquired by the acquiring unit to the server device.

6. The information processing apparatus according to claim 1, wherein the display control unit displays the indication that the printer can be registered with the server device by displaying a Web page that allows the printer to be registered with the server device.

7. A method for controlling an information processing apparatus connectable to an image pickup device and a server device, the image pickup device being connectable to a printer, the method comprising:

acquiring printer information indicating information on a printer connected to the image pickup device if the information processing apparatus is connected to the image pickup device;

determining whether the printer indicated by the printer information acquired can be registered with the server device; and displaying, on a display unit, an indication that the printer indicated by the printer information can be registered with the server device if it is determined that the printer indicated by the printer information can be registered with the server device, wherein the printer information contains a number of times of established connection between the image pickup device and the printer, and the determining unit determines whether the printer indicated by the printer information can be registered with the server device by determining whether the number of times of established connection is equal to or larger than a predetermined number.

8. A non-transitory storage medium in which is stored a computer-readable program for causing a computer to execute a method for controlling an information processing apparatus connectable to an image pickup device and a server device, the image pickup device being connectable to a printer, the method comprising:

acquiring printer information indicating information on a printer connected to the image pickup device if the information processing apparatus is connected to the image pickup device;

determining whether the printer indicated by the printer information acquired can be registered with the server device; and displaying, on a display unit, an indication that the printer indicated by the printer information can be registered with the server device if it is determined that the printer indicated by the printer information can be registered with the server device, wherein the printer information contains a number of times of established connection between the image pickup device and the printer, and the determining unit determines whether the printer indicated by the printer information can be registered with the server device by determining whether the number of times of established connection is equal to or larger than a predetermined number.

* * * * *